US007685518B2

(12) United States Patent
Matsuda et al.

(10) Patent No.: US 7,685,518 B2
(45) Date of Patent: Mar. 23, 2010

(54) INFORMATION PROCESSING APPARATUS, METHOD AND MEDIUM USING A VIRTUAL REALITY SPACE

(75) Inventors: Koichi Matsuda, Tokyo (JP); Taketo Naito, Kanagawa (JP); Hiroshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 931 days.

(21) Appl. No.: 10/305,316

(22) Filed: Nov. 26, 2002

(65) Prior Publication Data

US 2003/0080989 A1 May 1, 2003

Related U.S. Application Data

(63) Continuation of application No. 09/229,819, filed on Jan. 13, 1999, now abandoned.

(30) Foreign Application Priority Data

Jan. 23, 1998 (JP) .............................. P10-026677

(51) Int. Cl.
*G06F 3/00* (2006.01)

(52) U.S. Cl. ...................................................... 715/706

(58) Field of Classification Search .................. 715/706
See application file for complete search history.

(56) References Cited

U.S. PATENT DOCUMENTS 4,780,590 A 10/1988 Griner et al.
5,393,070 A 2/1995 Best
5,555,354 A 9/1996 Strasnick et al.
5,572,646 A 11/1996 Kawai et al.
5,580,801 A 12/1996 Maegawa et al.
5,598,536 A * 1/1997 Slaughter et al. ............ 709/219
5,680,524 A 10/1997 Maples et al.
5,682,469 A * 10/1997 Linnett et al. ............... 345/473
5,736,982 A 4/1998 Suzuki et al.
5,802,296 A 9/1998 Morse et al.
5,815,494 A 9/1998 Yamazaki et al.
5,848,134 A 12/1998 Sekiguchi et al.
5,880,731 A * 3/1999 Liles et al. .................. 715/758
5,886,697 A 3/1999 Naughton et al.
5,926,179 A * 7/1999 Matsuda et al. ............. 715/752

(Continued)

OTHER PUBLICATIONS

Besser, Howard Critical Thoughts About Tamagotchi, 1997, pp. 1-7 , 1-2.*

(Continued)

*Primary Examiner*—Ryan F Pitaro
(74) *Attorney, Agent, or Firm*—K&L Gates LLP

(57) ABSTRACT

An object in a virtual reality space is made perform complicated movements. A user (or a keeper) who controls an object (or a pet) in a virtual reality space enters a command at the client terminal of the user by means of chat operation. The entered command is sent to a server. The server has a table listing the relationship between commands and movements to be performed by the object in the virtual reality space. For example, the relation is between command "Jump" and movement of jumping. The server interprets the received command by referencing this table. The interpretation result is sent to the client terminal. On the client terminal, the object (the pet) in the virtual reality space performs complicated movements such as dancing according to the received interpretation result.

57 Claims, 22 Drawing Sheets

U.S. PATENT DOCUMENTS

| | | | | |
|---|---|---|---|---|
| 5,956,038 | A | 9/1999 | Rekimoto | |
| 5,963,217 | A * | 10/1999 | Grayson et al. | 345/473 |
| 6,002,401 | A | 12/1999 | Baker | |
| 6,003,065 | A | 12/1999 | Yan et al. | |
| 6,009,460 | A | 12/1999 | Ohno et al. | |
| 6,066,516 | A | 5/2000 | Miyasaka | |
| 6,175,842 | B1 * | 1/2001 | Kirk et al. | 715/513 |
| 6,213,871 | B1 * | 4/2001 | Yokoi | 463/7 |
| 6,219,045 | B1 | 4/2001 | Leahy et al. | |
| 6,253,167 | B1 | 6/2001 | Matsuda et al. | |
| 6,271,842 | B1 | 8/2001 | Bardon et al. | |
| 6,311,195 | B1 * | 10/2001 | Hachiya et al. | 715/512 |
| 6,331,840 | B1 | 12/2001 | Nielson et al. | |
| 6,373,870 | B1 | 4/2002 | Yamazaki et al. | |
| 6,476,830 | B1 * | 11/2002 | Farmer et al. | 715/769 |
| 6,558,991 | B2 | 5/2003 | Yamazaki et al. | |
| 6,570,968 | B1 | 5/2003 | Marchand et al. | |
| 6,602,744 | B1 | 8/2003 | Ino et al. | |
| 6,657,154 | B1 | 12/2003 | Tanabe et al. | |
| 6,863,733 | B1 | 3/2004 | Tanabe | |
| 6,830,617 | B1 | 12/2004 | Ohtani et al. | |
| 2001/0000243 | A1 | 4/2001 | Sugano et al. | |
| 2002/0045288 | A1 | 4/2002 | Yamazaki et al. | |
| 2002/0068391 | A1 | 6/2002 | Jung | |
| 2002/0096680 | A1 | 7/2002 | Sugano et al. | |
| 2004/0060515 | A1 | 4/2004 | Tanabe et al. | |
| 2004/0106237 | A1 | 6/2004 | Yamazaki | |
| 2005/0009251 | A1 | 1/2005 | Yamazaki et al. | |
| 2005/0037554 | A1 | 2/2005 | Ohtani et al. | |

OTHER PUBLICATIONS

Michael Benedikt, *Cyberspace: First Steps*, 1991, pp. 282-307 (Japanese translated version) and pp. 273-301 (English language version) MIT Press Cambridge, MA.

Mark Pesce, *VRML: Browsing & Building Cyberspace*, 1995, pp. 43-51, New Readers Publishing.

Matsuda et al., *Most Recent Trend of VRML and Cyberpassage*, the bit Magazine, vol. 28, No. 7, pp. 29-36.

Matsuda et al., *Most Recent Trend of VRML and Cyberpassage*, the bit Magazine, vol. 28, No. 8, pp. 57-65.

Matsuda et al., *Most Recent Trend of VRML and Cyberpassage*, the bit Magazine, vol. 28, No. p, pp. 29-36.

Matsuda et al., *Most Recent Trend of VRML and Cyberpassage*, the bit Magazine, vol. 28, No. 10, pp. 49-58.

Nikkei Electronics, Sep. 9, 1996, No. 670, pp. 151-159.

Nikkei Electronics, Apr. 7, 1997, No. 686, pp. 131-134.

* cited by examiner

FIG. 8

| No | VIRTUAL REALITY LIFE OBJECT DATA | | | | | | | | | KEEPER DATA | | | RESERVE |
|---|---|---|---|---|---|---|---|---|---|---|---|---|---|
| | 3D OBJECT ID | COORDINATE AXIS | KIND | GENDER | NICK-NAME | BIRTH DATE | BIRTH PLACE WORLD | GROWTH PARAMETER: PHYSICAL PARAMETER | GROWTH PARAMETER: MENTAL PARAMETER | NAME | COMMUNICATION MEANS | ADDRESS | |
| 1 | Obj 1 | x1, y1, z1 | MONKEY | MALE | Taro | 970112 | Zoo | | | Hiroyuki Hanaya | 0 | hanaya @ipd.sony.co.jp | |
| 2 | Obj 1 | x2, y2, z2 | CAT | FEMALE | Mike | 970210 | Park | | | Kouich Matusumoto | 1 | 03-5448-4443 | |

| HEIGHT cm | WEIGHT kg | PHYSIQUE INDEX | APPETITE INDEX | HEIGHT INDEX | LIFE SPAN REMAINED |
|---|---|---|---|---|---|
| 50 | 10 | 5/10 | 6/10 | 4/10 | 240 |

| INTELLIGENCE QUOTIENT | LANGUAGE PROFICIENCY INDEX | SOCIABILITY INDEX | INDEPENDENCE INDEX | ACTIVITY INDEX | MOOD INDEX |
|---|---|---|---|---|---|
| 2/10 | 5/10 | 2/10 | 1/10 | 5/10 | 5/10 |

| COMMUNICATION MEANS | |
|---|---|
| 0 | ELECTRONIC MAIL |
| 1 | TELEPHONE (ANALOG VOICE) |
| 2 | WIRELESS MAIL SERVICE |
| 3 | FAX |
| 4 | PAGER |
| 5 | RESERVED |
| 6 | RESERVED |
| 7 | RESERVED |

INFORMATION PROCESSING APPARATUS, METHOD AND MEDIUM USING A VIRTUAL REALITY SPACE

CROSS REFERENCE TO RELATED APPLICATIONS

This patent application is a continuation of U.S. application Ser. No. 09/229,819, filed on Jan. 13, 1999, which is incorporated herein by reference, now abandoned.

BACKGROUND OF THE INVENTION

The present invention generally relates to an information processing apparatus, an information processing method, and an information providing medium. More particularly, the present invention relates to an information processing apparatus, an information processing method, and information providing medium that control a virtual reality life object to be reared in a virtual reality space.

A cyberspace service named Habitat (registered trademark) is known in so-called personal computer communications services such as NIFTY-Serve (registered trademark) of Japan and CompuServe (registered trademark) of US in which a plurality of users connect their personal computers via modems and public telephone networks to the host computers installed at the centers of the services to access them in predetermined protocols.

Development of Habitat started in 1985 by Lucas Film of the US, operated by Quantum Link, one of US commercial networks, for about three years. Then, Habitat started its service in NIFTY-Serve as Fujitsu Habitat (trademark) in February 1990. In Habitat, users can send their alter egos called avatars (the incarnation of a god figuring in the Hindu mythology) into a virtual city called Populopolis drawn by two-dimensional graphics to have a chat (namely, a realtime conversation based on text entered and displayed) with each other. For further details of Habitat, refer to the Japanese translation "pp. 282-307" of "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010.

In the conventional cyberspace systems operated by personal computer communications services such as mentioned above, a virtual street and the inside of a room for example are drawn in two-dimensional graphics. Therefore, moving an avatar in the depth direction is realized simply by moving it up and down in the background of the two-dimensional graphics. This results in a poor expression in simulating walking and movement in a virtual reality space. Also, the two-dimensional virtual reality space in which own avatar and the avatar of another user are displayed is viewed from a viewpoint of a third party, thereby impairing the sense of simulated experience.

To overcome this drawback, a capability that enables a user to walk as desired with the viewpoint of the avatar of the user in a virtual reality space represented in three-dimensional graphics is realized by use of a three-dimensional graphics data description language called VRML (Virtual Reality Modeling Language) as disclosed in Japanese Patent Laid-open No. Hei 09-81781 corresponding to U.S. patent application Ser. No. 08/678,340. Considerations about various cyberspaces in which chat is made by use of the avatar of a user are described in NIKKEI Electronics, Sep. 9, 1996, No. 670, pp. 151-159.

Recently, breeding simulation games for breeding tropical fish and a virtual reality creature having artificial intelligence living in a virtual world for example have come to be available as personal computer software programs. A product is also known that displays a simulated pet such as a dog or a cat on an electronic notepad to enjoy the process of its growth (refer to NIKKEI Electronics, Apr. 7, 1997, No. 686, pp. 131-134). In addition, "Tamagotchi" (registered trademark) developed and commercialized by Bandai Co. is widely known that is an egg-sized portable virtual reality pet with a breeding simulation game program as mentioned above incorporated.

Virtual reality pets of this type have a CPU (Central Processing Unit), a ROM (Read Only Memory), a RAM (Random Access Memory) and so on mounted on a single-chip LSI (Large Scale Integration), a breeding simulation game program being stored in the ROM, the figure and state of the pet being displayed on an LCD (Liquid Crystal Display) device. The user gives such instructions by operating buttons as "feed" and "clean up" for example necessary for breeding the virtual reality creature as a pet. As a result of caring, the virtual reality creature displayed on the LCD grows stepwise from an egg to a chick to a grown-up bird for example in its external view.

The virtual reality creature is programmed such that proper instructions given help the virtual reality creature grow without problem and improper instructions given make it sick or, in the worst case, die. Further, the virtual reality creature is programmed to make various requests based on the time elapsing from its birth provided by an incorporated calendar timer. For example, in the nighttime zone, the virtual reality creature requests a sleep and, in the mealtime zone, it requests food. In other times, the virtual reality creature requests, at random, snack and play for example. If the user fails to answer these requests properly, the growth of the virtual reality creature may be retarded or its character worsens. If the user answers properly, the life of the virtual reality creature is lengthened.

Meanwhile, Japanese Patent Laid-open No. Hei 07-160853 corresponding to U.S. Pat. No. 5,572,646 discloses a technology applicable to an electronic notepad for example for displaying images according to the growth processes of a virtual reality creature such as an animal or a plant. To be more specific, bit-map images representing the growth processes of a plant character for example are stored in the ROM in the electronic notepad. The plant character according to the degree of growth is displayed on the LCD of the electronic notepad and, at the same time, characters representing plant growing elements (water, light, and fertilizer for example) are displayed. Necessary amounts of these growing elements are inputted by operating corresponding keys on the electronic notepad. The inputted values are set to a water amount register, a light amount register, and a fertilizer amount register respectively in the RAM of the electronic notepad. Based on the values set to these registers, a new degree of growth is computed. Then, the plant character corresponding to the computed degree of growth is read from the ROM to be displayed on the LCD. Thus, the plant growth process according to the state of cultivation by the user is displayed.

However, having a virtual reality pet perform a predetermined movement in such a virtual reality space as described above requires a user to select predetermined buttons. This consequently prevents the user from having a virtual reality pet perform complicated movements or unique movements.

SUMMARY OF THE INVENTION

It is therefore an object of the present invention to provide an information processing apparatus, an information processing method, and an information providing medium that allow a user to have a virtual reality pet perform complicated or unique movements in a simple and reliable manner.

In carrying out the invention and according to a first aspect thereof, there is provided an information processing method for receiving the provision of a virtual reality space from a server through a network, comprising steps of: inputting a command for making an object under control in the virtual reality space perform a predetermined movement; sending the command to the server; receiving a control instruction for controlling a behavior of the object under control in response to the command from the server; and controlling, based on the control instruction, the displaying of the object under control.

In carrying out the invention and according to a second aspect thereof, there is provided an information processing apparatus connected to a server through a network for receiving the provision of a virtual reality space, comprising: an inputting means for inputting a command for making an object under control in the virtual reality space perform a predetermined movement; a sending means for sending the command to the server; a receiving means for receiving a control instruction for controlling a behavior of the object under control in response to the command from the server; and a control means for controlling, based on the control instruction, the displaying of the object under control.

In carrying out the invention and according to a third aspect thereof, there is provided an information providing medium for providing a computer program comprising steps of: inputting a command for making an object under control in the virtual reality space perform a predetermined movement; sending the command to the server; receiving a script for controlling a behavior of the object under control in response to the command from the server; and controlling, based on the script, the displaying of the object under control.

In carrying out the invention and according to a fourth aspect thereof, there is provided an information processing method for providing a virtual reality space to a client terminal connected through a network, comprising steps of: receiving a command associated with a predetermined movement to be performed by an object under control in the virtual reality space from the client terminal; interpreting the command received by the receiving step by referencing a table listing a relationship between the command and the predetermined movement to be performed by the object under control; and transmitting a control instruction for controlling the displaying of the object under control based on a result of the interpretation by the interpreting step.

In carrying out the invention and according to a fifth aspect thereof, there is provided an information processing apparatus for providing a virtual reality space to a client terminal connected to the information processing apparatus through a network, comprising: a receiving means for receiving a command associated with a predetermined movement to be performed by an object under control in the virtual reality space from the client terminal; a storing means for storing a table listing a relationship between the command and the predetermined movement to be performed by the object under control; an interpreting means for interpreting the command received by the receiving means by referencing the table; and transmitting a control instruction for controlling the displaying of the object under control based on a result of the interpretation by the interpreting means.

In carrying out the invention and according to a sixth aspect thereof, there is provided an information providing means for providing a computer program for providing a virtual reality space to a client terminal connected through a network, the computer program comprising steps of: receiving a command associated with a predetermined movement to be performed by an object under control in the virtual reality space from the client terminal; interpreting the command received by the receiving step by referencing a table listing a relationship between the command and the predetermined movement to be performed by the object under control; and transmitting a control instruction for controlling the displaying of the object under control based on a result of the interpretation by the interpreting step.

BRIEF DESCRIPTION OF THE DRAWINGS

These and other objects of the invention will be seen by reference to the description, taken in connection with the accompanying drawing, in which:

FIG. 8 is a diagram illustrating an example of a growth parameter control table;

DETAILED DESCRIPTION OF PREFERRED EMBODIMENTS

Figure 1:
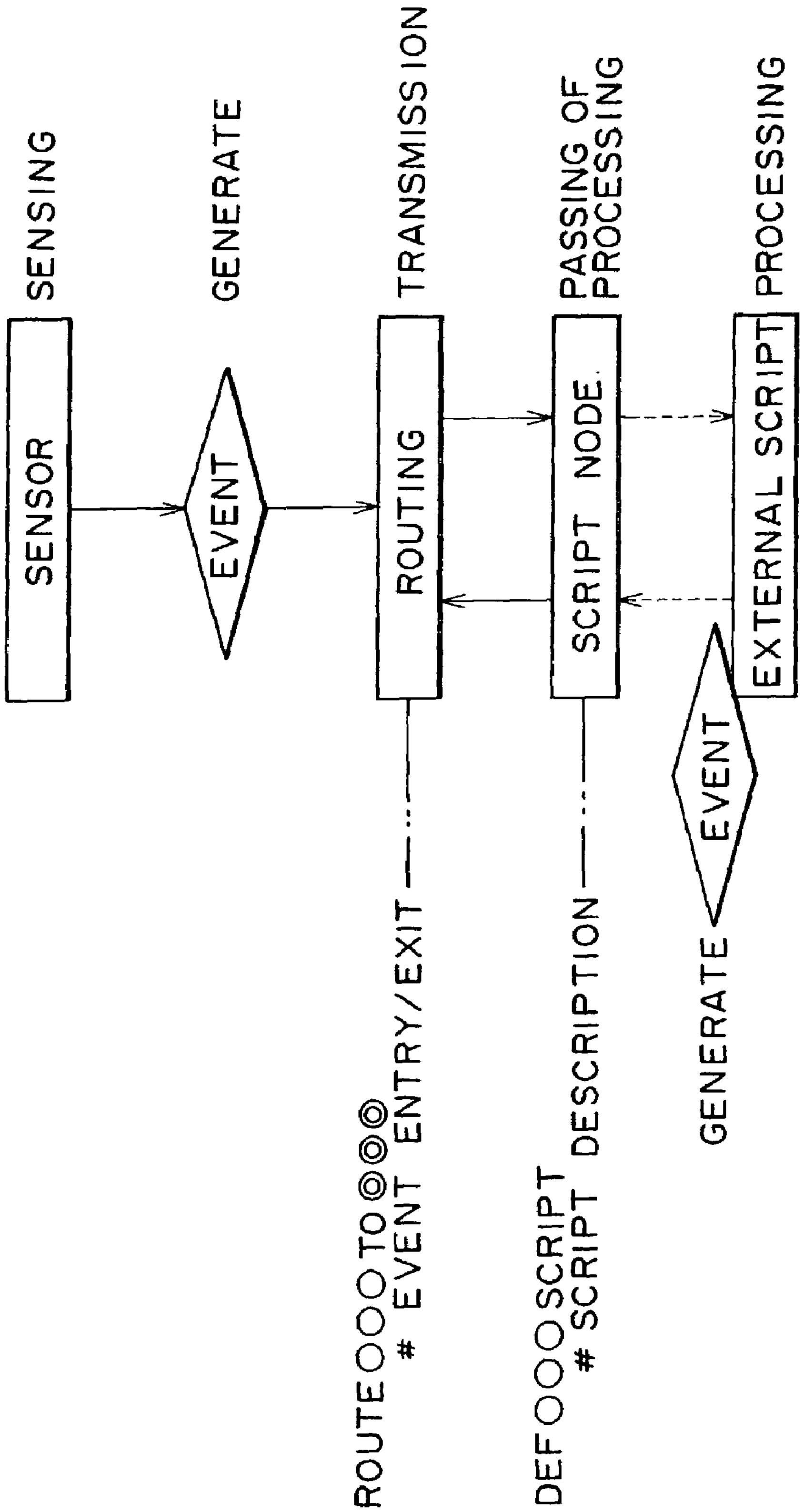
FIG. 1 is a diagram illustrating a relationship between a sensor, an event, a routing, and a script.

This invention will be described in further detail by way of example with reference to the accompanying drawings.

First, there will be described VRML (Virtual Reality Modeling Language), which is a descriptive language enabling users to integrally handle three-dimensional information by use of the framework of the WWW (World Wide Web) for providing a variety of information through the Internet, a computer network built worldwide.

Meanwhile, for an information providing system available on the Internet, the WWW developed by CERN (European Center for Nuclear Research) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW server is constituted by server software called an HTTP daemon and an HTML file in which hyper text information is stored. The wording "daemon" means a program for executing management and processing in the background upon working on UNIX. The hyper text information is described in a description language called HTML (Hyper Text Makeup Language). In the description of a hypertext by HTML, a logical structure of a document is expressed in a format specification called a tag enclosed by "<" and ">". Description of linking to other information is made based on link information called an anchor. A method in which a location at which required information is stored by the anchor is URL (Uniform Resource Locator).

A protocol for transferring a file described in HTML on the TCP/IP (Transmission Control Protocol/Internet Protocol) network is HTTP. This protocol has a capability of transferring a request for information from a client to the WWW server and the requested hyper text information stored in the HTML file to the client.

Used by many as an environment for using the WWW is client software such as Netscape Navigator (trademark of Netscape Communications Corp. of US) called a WWW browser.

Use of the WWW browser allows users to browse files, which are called home pages, corresponding to URLs stored in WWW servers on the Internet built worldwide, thereby performing net-surfing by sequentially following home pages linked to each other to access a variety of WWW information sources.

Recently, a VRML browser has been developed by extending this WWW. The VRML browser displays a three-dimensional space described in a three-dimensional graphics language called VRML that enables description of a three-dimensional space and setting of hypertext links to objects drawn in three-dimensional graphics, thereby allowing users to follow these links to sequentially access WWW servers.

Details of VRML are described in the Japanese translation of "VRML: Browsing & Building Cyberspace," Mark Pesce, 1995, New Readers Publishing, ISBN 1-56205-498-8, the translation being entitled "Getting to Know VRML: Building and Browsing Three-Dimensional Cyberspace," translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published on Mar. 25, 1996, Prenticehall Publishing, ISBN4-931356-37-0, as well as "Most Recent Trend of VRML And CyberPassage," Koichi Matsuda and Yasuaki Honda, the bit Magazine, Kyoritsu Publishing, 1996, Vol. 28, No. 7, pp. 29-36, No. 8, pp. 57-65, No. 9, pp. 29-36, No. 10, pp. 49-58.

The authorized and complete specifications of the Virtual Reality Modeling Language Version 2.0, ISO/IEC CD 14772, released on Aug. 4, 1996, are available on the Internet.

Further, for the browser for VRML 2.0 and the software for shared server, Sony Corporation, the present applicant, has developed and commercialized as Community Place Browser/Bureau (registered trademark), of which beta version is downloadable from the Internet home page of Sony.

To build a three-dimensional virtual reality space by use of VRML 2.0, a VRML file for representing a desired content is created by generating graphics data indicative of the shape and behavior of an object (or a model) in the virtual reality space by use of VRML (model creation), adding the model in the virtual reality space displayed on the screen to a switch (or a sensor) for generating an event when the user clicks the model with the mouse for example, programming (or scripting) a script for realizing an event to be generated when the sensor is pointed, and relating (or routing) between graphics data and script (hereafter, common nodes such as write specified in graphics data, script, and VRML are also generically referred to as nodes) such as operating the sensor and starting the script.

The following describes a mechanism for implementing an autonomous behavior in a VRML space, a new feature provided by VRML 2.0, not supported by VRML 1.0.

VRML 2.0 data is constituted by a node and a field, which is basically written as follows:

Node {Field(s)}

In the above-mentioned file syntax, "Field (s)" may be omitted but "Node" and the braces "{", "}" cannot. A field passes a variable to a node to specify a node parameter. If the field is omitted, a default is used. There are two types of fields. A single-value field (SF) having only one value and a multiple-value field (MF) having two or more values. Each single-value field begins with "SF" and each multiple-value field begins with "MF."

VRML 2.0 realizes an autonomous movement (behavior) of an object according to an event to be caused by an operation performed on the object arranged in a three-dimensional virtual reality space and a timer event that occurs when a preset time has been reached. The mechanism of this Behavior is realized by the cooperation of three elements; sensor, routing, and script as follows.

(1) A sensor node described as a VRML file related to a node such as an object arranged in a three-dimensional virtual reality space beforehand senses an external event based on a change in its field value to generate an event in a VRML scene.

(2) The generated event is transmitted to an external script, which is a program for specifying the behavior of the object based on a routing described as a VRML file.

(3) The external script describes beforehand a method to be called when a particular event is received. The external script, which has received the event transmitted by the routing, executes the processing based on the description and then changes the value of the field of the corresponding node in the VRML scene based on the result of the processing and the description of the routing.

For sensor nodes, the VRML 2.0 defines TouchSensor that causes an event when the pointing device passes over a specified object or the same is clicked by the user, ProximitySensor that causes an event when ViewPoint (of the user) enters a specified region, and TimeSensor that is caused every time a preset time interval elapses, for example.

The following describes the mechanism of Behavior in more detail. As described above, the mechanism of Behavior is implemented by a sensor, an event, a routing, and a script.

The sensor is functionally divided into the following two types:

the type for sensing a user operation; and the type for sensing a system change.

The sensor for sensing a user operation provides a software switch related to an object arranged in a three-dimensional virtual reality space. The sensor for sensing a system change starts a timer preset to a start time. These sensors sense these external events and convert them into events inside VRML.

The event indicates data for transmitting information between associated nodes in VRML. Actually, a change in a field value described in a VRML file is transmitted as an event.

The routing is a mechanism for specifying to which node an event sensed by the sensor capability is to be transmitted. Actually, the routing specifies a path of information transmission by the event.

The script provides an input/output port, performs some computation from an inputted event, and outputs a result of the computation. The script is not restricted to a particular language. In the current stage, the script can be written in Java (registered trademarks of Sun Microsystems, Inc. of US) and JavaScript noticed in the Internet, C language widely used in ordinary systems, Tcl/Tk and PERL widely used in UNIX, or Visual Basic provided by Microsoft Corporation of US. Thus, VRML 2.0 does not depend on a particular script language (in the course of defining VRML 2.0 specifications, employment of VRMLScript as particular language specifications was discussed but this idea was eventually discarded).

The following describes the processing means of Behavior with reference to FIG. 1. The processing by Behavior is diagramatically represented as shown in FIG. 1. The Following Describes Flows of Processing Signals.

(1) Sensor Node

As described above, the sensor node is largely classified into two types; a sensor for sensing a user operation and a sensor for sensing a system change.

The sensor for sensing a user operation has sensor nodes such as TouchSensor and PlaneSensor for sensing a mouse click on a three-dimensional object and passing of a pointing device over a plane of the three-dimensional object. The sensor for sensing a system change has TimeSensor adapted to generate an event when a preset time has been reached.

In the example of FIG. 1, it is assumed that TouchSensor is attached to a sphere. When an user clicks the sphere, this event is sensed by TouchSensor. This event is sensed because the field value of the eventOut field of TouchSensor changes. Generally, one mouse click operation generates two events; namely, the timing of pressing the mouse button and the timing of releasing the mouse button.

Then, this event is routed by the routing description part.

(2) Routing

Figure 2:
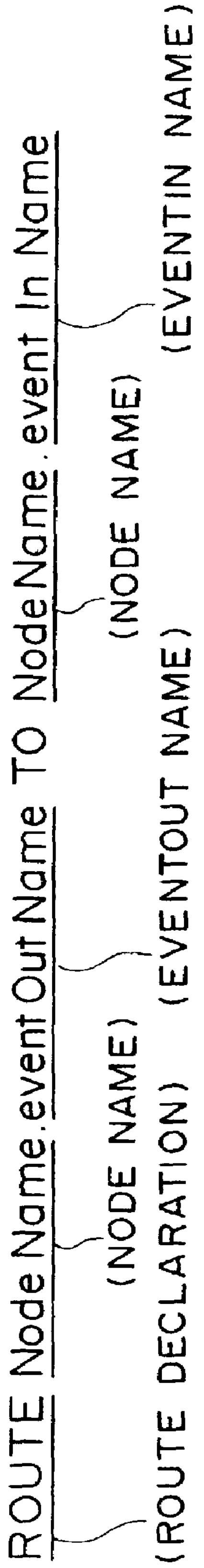
FIG. 2 is a diagram illustrating a routing.

"Route" as shown in FIG. 2 specifies routing of this event.

When an event caused in the sensor description part is transmitted to the eventOut field of the Route and then to a script node to be described below, the event is passed to the external file, upon which the Behavior capability is executed.

(3) Script Node

This is a node for mediating the interlocking between a VRML file and an external script. This node specifies the language in which the description is made and a file name according to the description format of the script node, and the eventIn field and the eventOut field in order to give and take the event to and from the external script file. Available script files include those written in Java, JavaScript, C language, Tcl/Tk, PERL, and Visual Basic.

In actual processing, the processing is transmitted to the script file in which the routed event is described in the script node and the external script file is executed. The external script file is received through eventIn (event entrance) defined in it and the processing described in that file is executed. When this processing has come to an end, the processing result is returned through eventOut (event exit) to the routing of the VRML file. The VRML file executes this returned result, upon which the series of Behavior processing operations come to an end.

Use of the mechanism of Behavior to be realized by the above-mentioned cooperation between the sensor, the routing, and the script allows the user to dynamically change the external view (shape, attitude, size, color, and so on) or behavioral sequence for example of an object arranged in a three-dimensional virtual reality space by clicking an object resembling a switch also arranged in this space.

Details of the Behavior mechanism are disclosed in Section 4 "Concept" in the Specifications "The Virtual Reality Modeling Language Version 2.0," ISO/IEC CD 14772, Aug. 4, 1996, which are available on the Internet. This section describes the key concepts of the VRML specifications. These concepts include various general node-related items such as a method of linking a node to a scene graph, a method in which a node generates or receives an event, a method of generating a node type by a prototype, a method in which a node type is added to VRML and then exported to be made available from outside, and a method of incorporating a script to operate as a program into a VRML file.

The following describes a technology in which, by application of the mechanism for realizing the above-mentioned autonomous movement (Behavior) of VRML 2.0, a virtual reality life object is created in a shared virtual reality space, growth parameters (external growth or internal growth (personality)) that change according to the generation of an event such as a user operation or passing of a predetermined time are controlled by a server, and a script program for dynamically changing one or both of the external view (shape, attitude, size, color, and so on) and the behavioral sequence of the created virtual reality life object based on the growth parameters transferred from this server is interpreted and executed, thereby displaying the virtual reality life object according to the growth parameters.

Figure 3:
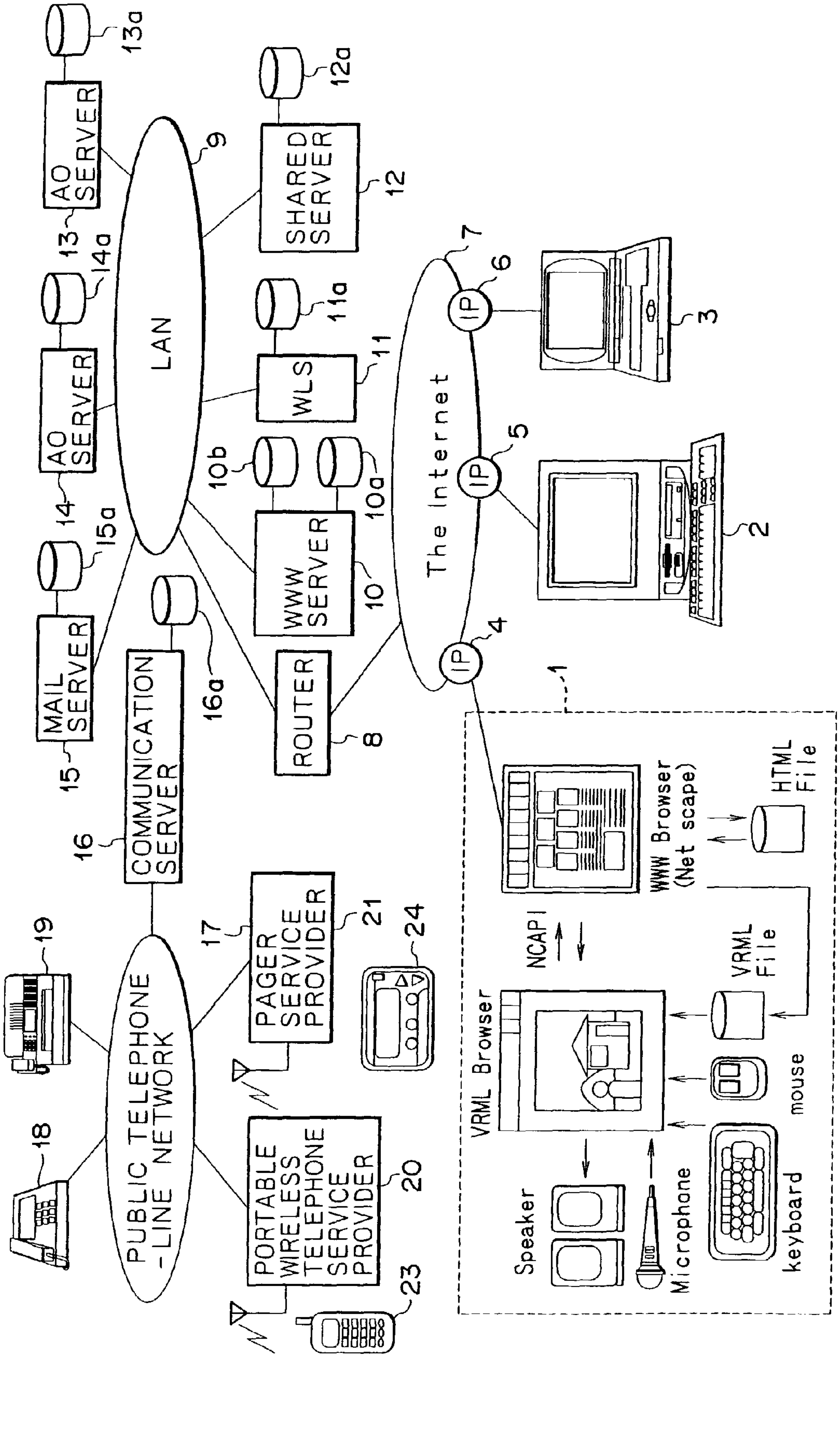
FIG. 3 is a block diagram illustrating an example of a constitution of a shared virtual reality space providing system associated with the present invention.

FIG. 3 is a schematic diagram illustrating an entire system practiced as one preferred embodiment of the present invention.

In FIG. 3, a VRML browser and a WWW browser are installed client PCs (Personal Computers) 1 through 3, which are connected to the Internet 7 through IPs (Internet Service Providers) 4 through 6.

A LAN (Local Area Network) 9 connected to the Internet 7 through a router 8 is connected to a WWW server 10, a WLS (World Location Server) 11, a shared server 12, AO (Application Object) servers 13 and 14, a mail server 15, and a communication server 16. The WWW server is provided with hard disk (HDD) 10*a* and 10*b*, the WLS server 11 with a hard disk 11*a*, the shared server 12 with a hard disk 12*a*, the AO server 13 with a hard disk 13*a*, the AO server 14 with a hard disk 14*a*, the mail server 15 with a hard disk 15*a*, and the communication server 16 with a hard disk 16*a*.

The communication server 16 is connected to a telephone 18 and a facsimile 19 through a public telephone network 17, to a portable telephone terminal 23 through a wireless telephone service provider 20 in a wireless manner, and to a paging terminal 24 through a paging service provider 21 in a wireless manner.

Figure 4:
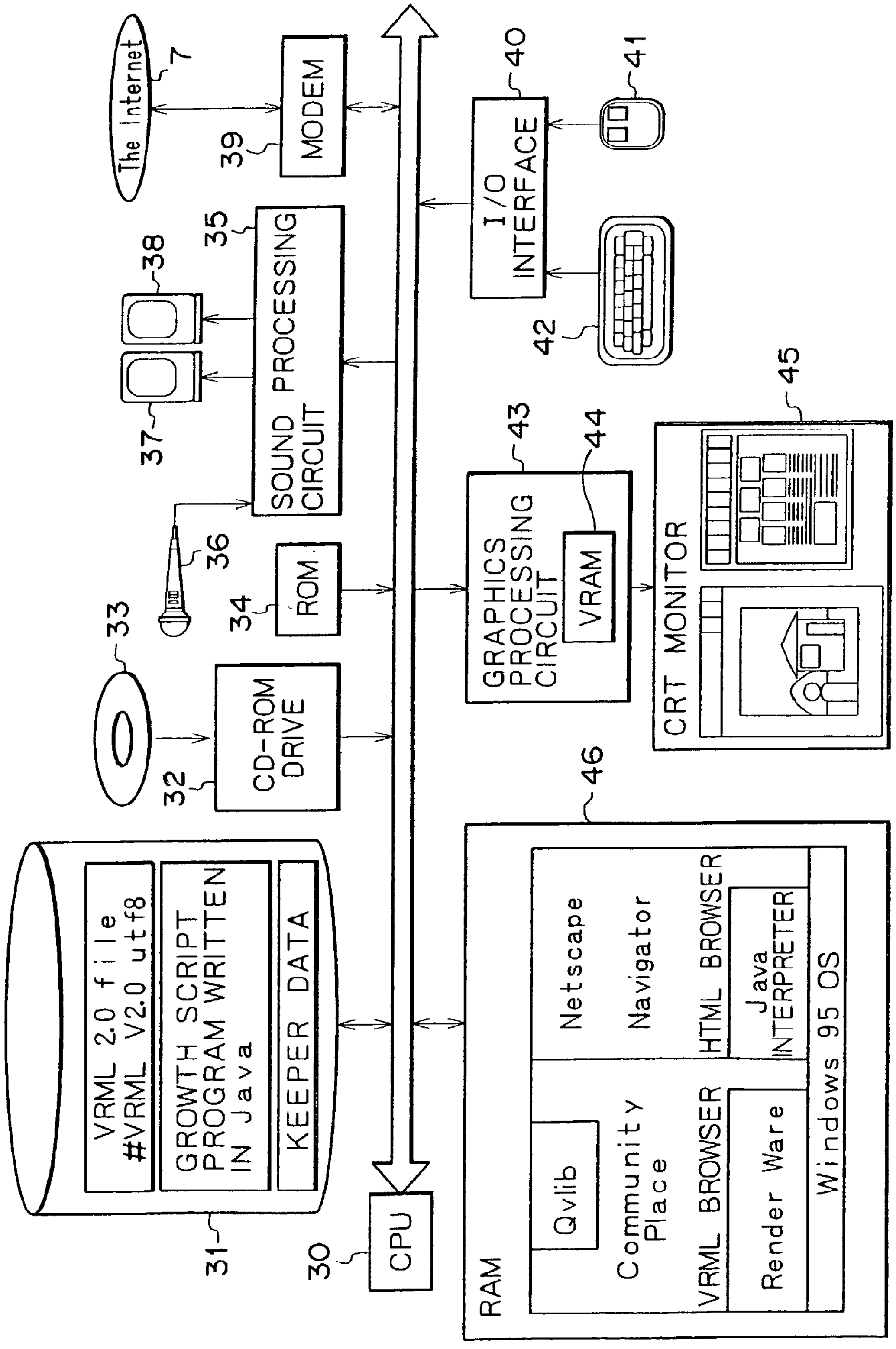
FIG. 4 is a block diagram illustrating an example of a constitution of the client PC 1 shown in FIG. 3.

The following describes a hardware constitution of the client PC 1 with reference to FIG. 4.

In FIG. 4, a CPU (Central Processing Unit) 30 of the client PC1 controls the other components of this client PC. A hard disk drive (HDD) 31 stores VRML contents composed of a VRML 2.0 file and a growth script program for a shared virtual reality life by Java (registered trademark of Sun Microsystems, Inc. of US), and data about the keeper of the virtual reality creature. A CD-ROM drive 32 reads VRML contents stored in a CD-ROM disc 33. A ROM 34 stores a BIOS (Basic Input/Output System) and so on. A sound processor 35 is connected to a microphone 36 and left and right speakers 37 and 38. A MODEM 39 connects this client PC to the Internet 7. An I/O (Input/Output) interface 40 is connected to a mouse 41 and a keyboard 42. A graphics processor 43 incorporates a VRAM (Video RAM) 44. A CRT monitor 45 displays an image signal outputted from the graphics processor 43. A RAM 46 stores various computer programs.

In the RAM 46, Netscape Navigator, which is a WWW browser operating on Windows 95 (registered trademark of Microsoft Corporation of US), the Java interpreter, and Community Place Browser, which is a VRML 2.0 browser developed by Sony Corporation, are read at run time and are ready for execution by the CPU 30.

The VRML 2.0 browser is installed with QvLib, which is a VRML syntax interpreting library (parser) developed by Silicon Graphics, Inc. in US and offered without charge, RenderWare, which is a software renderer developed by Criterion Software Ltd. in England, and so on or other parser and renderer having equivalent capabilities.

As shown in FIG. 3, Community Place Browser transfers data of various types with Netscape Navigator, a WWW browser, based on NCAPI (Netscape Client Application Programming Interface) (registered trademark).

Receiving an HTML file and VRML content (including a VRML file and a script program written in Java) from the WWW server 10, Netscape Navigator stores them in the local HDD (Hard Disk Drive) 31. Netscape Navigator processes the HTML file to display text and images on the CRT monitor. On the other hand, Community Place Browser processes the VRML file to display a three-dimensional virtual reality space on the CRT monitor and changes the behavior of the object in the three-dimensional virtual reality space according to the result of processing of the script program by the Java interpreter.

It should be noted that the other client PCs 2 and 3 have generally the same constitutions, not shown, as that of the PC 1 described above.

The following describes the operation of the above-mentioned preferred embodiment.

First, a sequence spanning from actually downloading the VRML content through the Internet to providing a multi-user environment in which one virtual reality space is shared by plural users is described with reference to FIGS. 5 through 7.

Figure 5:
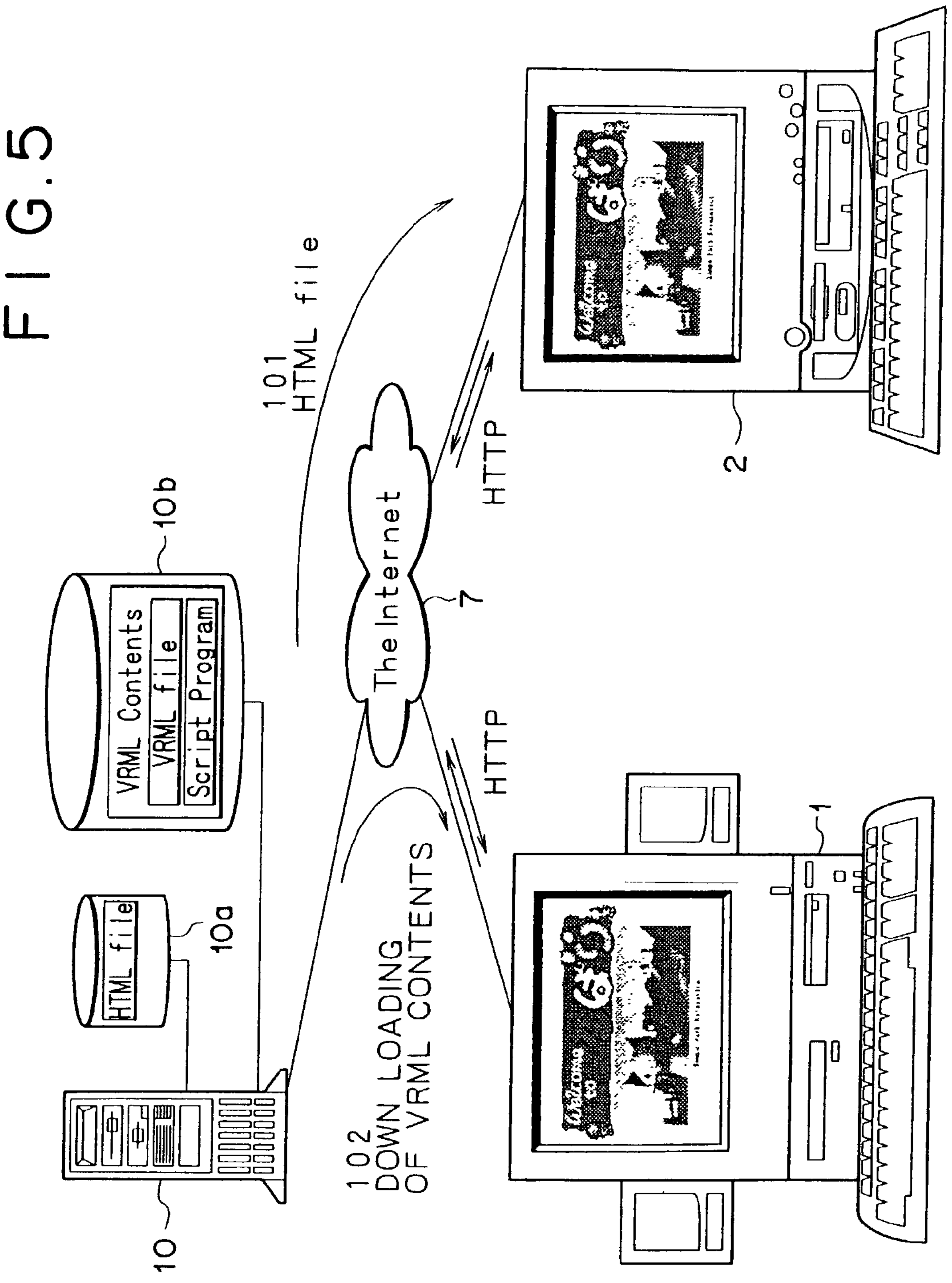
FIG. 5 shows display photographs for describing an operation of the system shown in FIG. 3.

Referring to FIG. 5, the home page of the Web site that provides the VRML content is browsed by use of the WWW browser as indicated by arrow 101. Next, as indicated by arrow 102, the users of the client PC 1 and the client PC 2 download the VRML content composed of the VRML 2.0 file and the script program (the growth script program written in Java) for realizing an autonomous movement (Behavior) in the VRML space.

Obviously, the VRML content provided in the CD-ROM disc 33 may be read by the CD-ROM drive 32.

Figure 6:
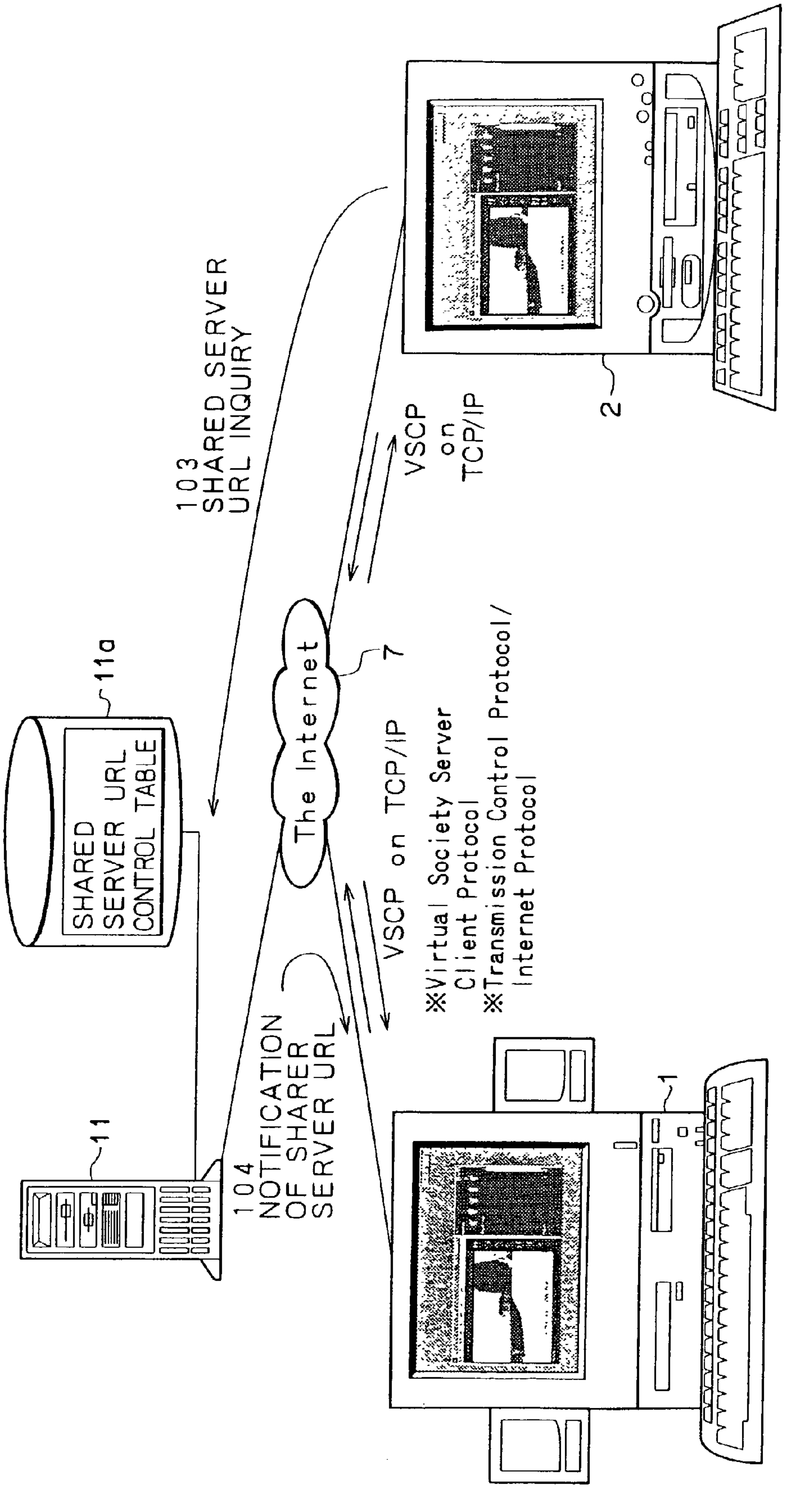
FIG. 6 shows display photographs for describing another operation of the system shown in FIG. 3.

Then, as shown in FIG. 6, in the client PC 1 and the client PC 2, the VRML 2.0 file downloaded and stored in the local HDD 31 is interpreted and executed by Community Place Browser, which is a VRML 2.0 browser. Next, as indicated by arrow 103, the client PCs ask the WLS 11 for the URL of the shared server 12 based on VSCP (Virtual Society Server Client Protocol). In response, as indicated by arrow 104, the WLS 11 references the shared server URL control table stored in the HDD 11*a* and sends the URL of the shared server 12 to the client PC 1 and the client PC 2.

Figure 7:
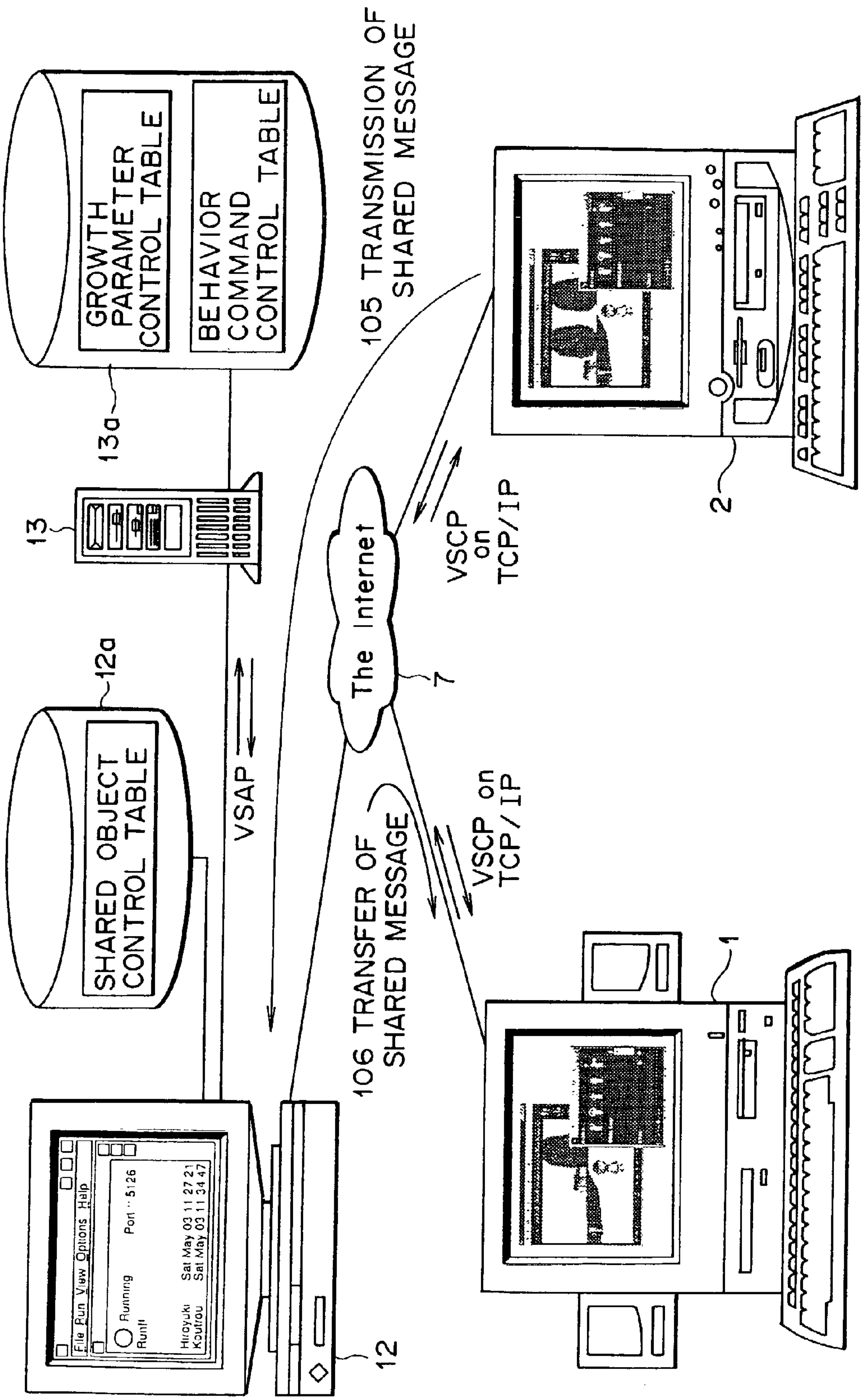
FIG. 7 shows display photographs for describing another operation of the system shown in FIG. 3.

Using this URL, the client PC 1 and the client PC 2 are connected to the shared server 12 as shown in FIG. 7. As a result, as shown with arrow 105, shared messages associated with the position and movement of the shared 3D object are transmitted through this shared server 12. These messages are transferred as shown with arrow 106 to realize the multi-user environment.

For detailed description of the procedure of the above-mentioned connection, refer to Japanese Patent Laid-open No. Hei 9-81781 corresponding to U.S. patent application Ser. No. 08/678,340.

The following describes the AO server 13 that controls the behavior of a virtual reality life object existing in the shared virtual reality space. The AO server 13 transfers data associated with the virtual reality life object with the shared server 12 based on VSAP (Virtual Society Server Application Protocol). The HDD 13*a* of the AO server stores a growth parameter control table and a behavior command control table for the virtual reality life object as shown in FIG. 7.

As shown in FIG. 8, the data of the growth parameter control table are largely classified into virtual reality life object data and keeper data.

The virtual reality life data includes a 3D object ID for uniquely identifying a 3D object in one shared virtual reality space, three-dimensional coordinate values representing the virtual reality life object in the shared virtual reality space, a type of a creature such as a monkey or a cat selected by the keeper, the gender of the creature, its nickname given by the keeper, a date initialized by the keeper, namely the birth date of the virtual reality life object, a world name (a world name of domicile of origin) given to the virtual reality space in which the virtual reality life object was born, and growth parameters of the virtual reality life object.

The growth parameters are largely classified into physical parameters for specifying the external growth of the virtual reality life and mental parameters for specifying the internal growth of the virtual reality life object reflecting its character.

The physical parameters are composed of height (in centimeters), weight (in kilograms), physique index, appetite index, health index, and remaining life time (in hours).

The mental parameters include intelligence quotient, language capability index, sociability index, independence index, activity index, and mood index.

These parameters are sequentially updated to values computed by a predetermined growth parameter computing equation based on a timer event caused when certain time has passed after the birth date initialized by the keeper, and an access event and an operation event caused by a call message and an operation message from the client PC.

Figure 9:
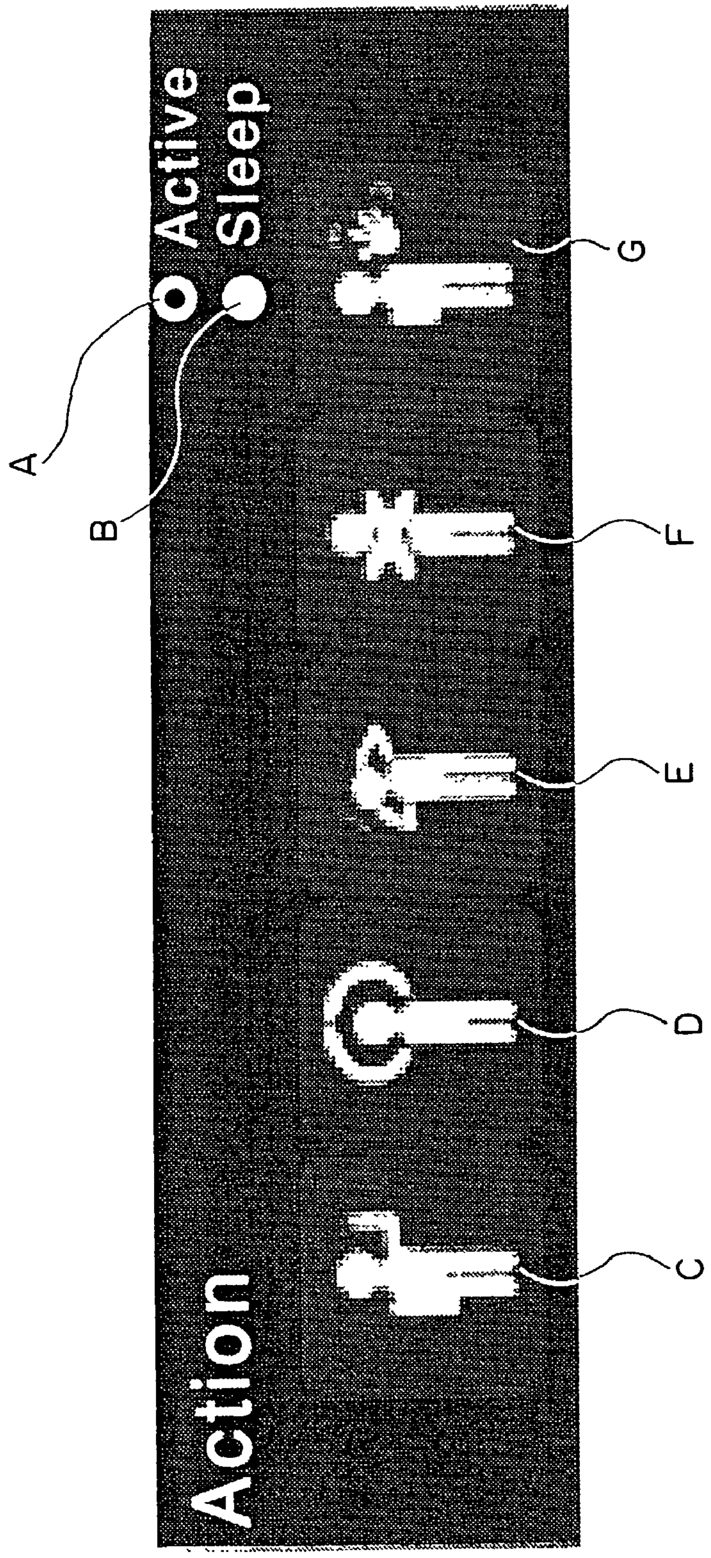
FIG. 9 shows a photograph for describing an action panel.

FIG. 9 shows capabilities of an action panel displayed beside the main window of the VRML browser on the CRT monitor screen 45 of the client PC 1.

In FIG. 9, "A" denotes a calling button represented as "Active." This button is clicked to call the virtual reality pet or wake up the sleeping virtual reality pet.

"B" denotes a button represented as "Sleep" for putting the virtual reality pet to bed.

"C" denotes a feeding button. This button is clicked to feed the virtual reality pet.

"D" denotes a praise button. This button is clicked to praise the virtual reality pet by smiling at it.

"E" denotes a play button. This button is clicked to play tag, in which the keeper chases the virtual reality pet until the same is blocked by a wall and cannot be escaped therefrom.

"F" denotes a scold button. This button is clicked to scold the virtual reality pet for discipline.

"G" denotes a groom button. This button is clicked to groom the virtual reality pet by brushing.

Figure 10:
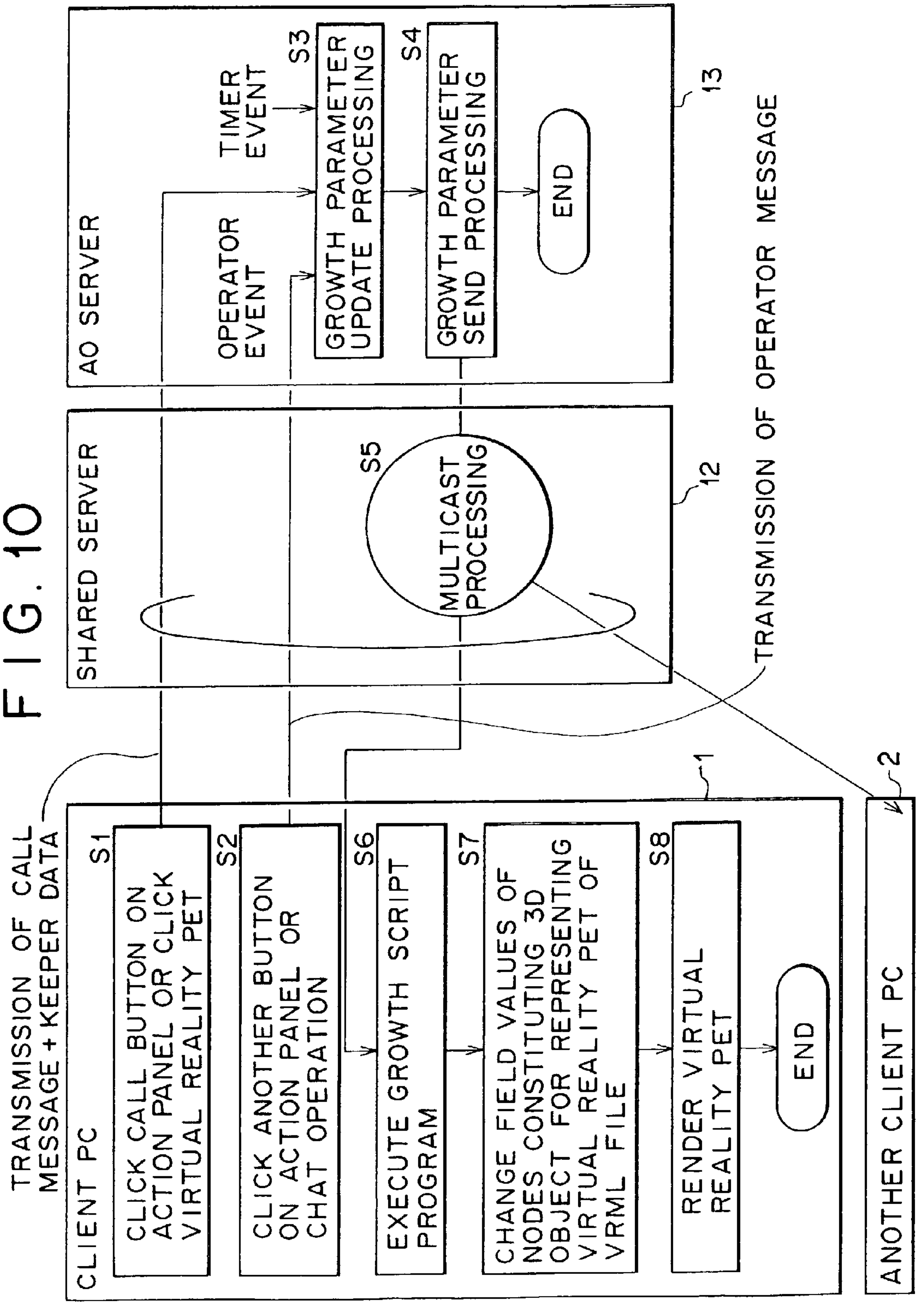
FIG. 10 is a diagram illustrating passing of a growth parameter.

As shown in FIG. 10 for example, when the call button A is clicked (the action panel is operated) on the own client PC 1 and a resultant call message is sent to the AO server 13 through the shared server 12 (step S1), growth parameter update processing is performed on the growth parameter control table based on that access event (step S3). Based on this access event, the appetite index, the health index, and the mood index are each incremented by 0.1 point from 1/10 to 10/10.

If the feeding button C is clicked for example and a resultant message is sent to the AO server 13 (step S2), the weight of the growth parameter increase every time the operation event occurs, along which the physique index is incremented by 0.1 point from 1/10 to 10/10 (step S3).

Then, when the timer event occurs as a result of passing of a predetermined time, the weight, one of the growth parameters, decreases, decrementing the physique index by 0.1 point (step S3).

For example, the growth parameters including this physique index are transferred (step S4) to the client PC 1 of the original keeper and another client PC 2 sharing the virtual reality space by multicast processing (step S5) of the shared server 12 every time the growth parameters are updated.

The client PC 1 executes the growth script program described with a processing procedure for controlling the autonomous behavior resulted from the virtual reality pet growth based on the growth parameters (step S6), changes the field values of the nodes constituting the 3D object for representing the virtual reality pet in the VRML file (step S7), performs rendering on the virtual reality pet on which the changed field values are reflected (step S8), and displays the rendered virtual reality pet on the main window of the VRML browser on the CRT monitor screen 45 of the client PC 1.

The same processing performed by the client PC 1 is also performed on the other client PC 2 sharing the virtual reality space. Consequently, rendering is performed on the appearance of the virtual reality pet on which the field value changed along the growth of the virtual reality pet is reflected, and the rendered virtual reality pet is also displayed on the main window of the VRML browser on the CRT monitor of the other client PC 2.

Figure 11:
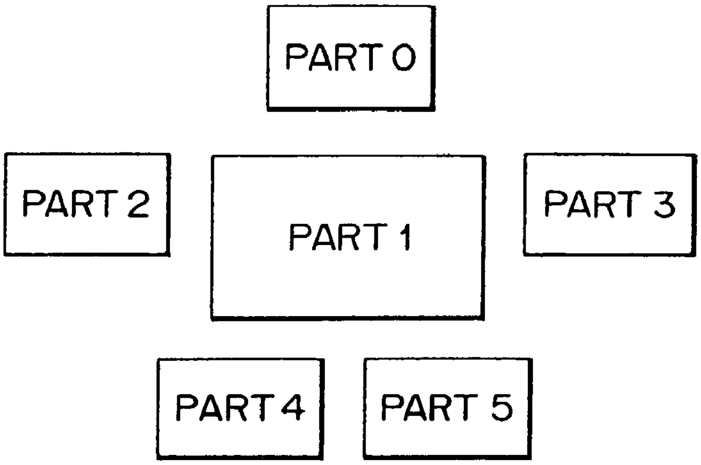
FIG. 11 is a diagram for describing virtual reality life object nodes constituting a 3D object.
Figure 12:
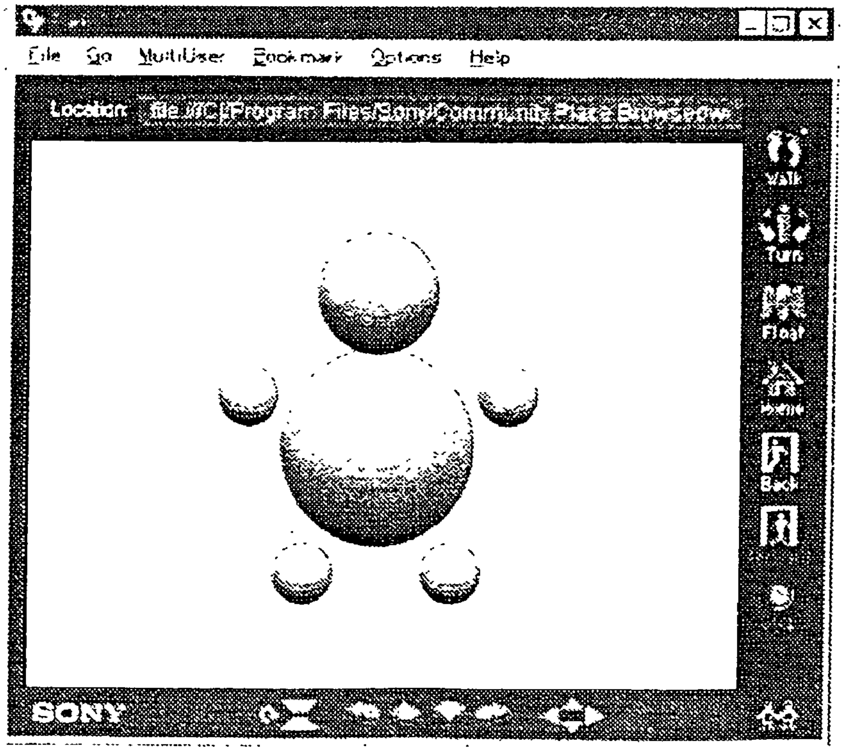
FIG. 12 shows a display photograph indicative of a display example corresponding to the nodes shown in FIG. 11.

FIG. 11 shows a relationship between part 0 through part 5 corresponding to the nodes constituting a 3D object for representing a virtual reality pet in the VRML file. FIG. 12 shows an example of displaying these parts. Part 0 corresponds to the head of the virtual reality pet, part 1 to its body, part 2 and part 3 to its right and left arms, and part 4 and part 5 to its right and left legs.

Changing the field values of the nodes corresponding to these parts 0 through 5 can dynamically change the external view (shape, attitude (orientation), size, color, and so on) and the behavioral sequence of each part of the virtual reality pet. These are all realized by the processing of the growth script program based on the growth parameters. Namely, these are realized by use of the mechanism of Behavior to be realized by the cooperative operation between the sensor, the routing, and the script defined in VRML 2.0.

Therefore, unlike the conventional method of displaying images of a virtual reality creature of portable electronic pet, it is unnecessary to store the bit-map images representing each growth process of the character of virtual reality creature in the ROM beforehand. Namely, use of the mechanism of Behavior can continuously and dynamically change the physique and behavior of a virtual reality pet according to its growth process for example.

Figure 13:
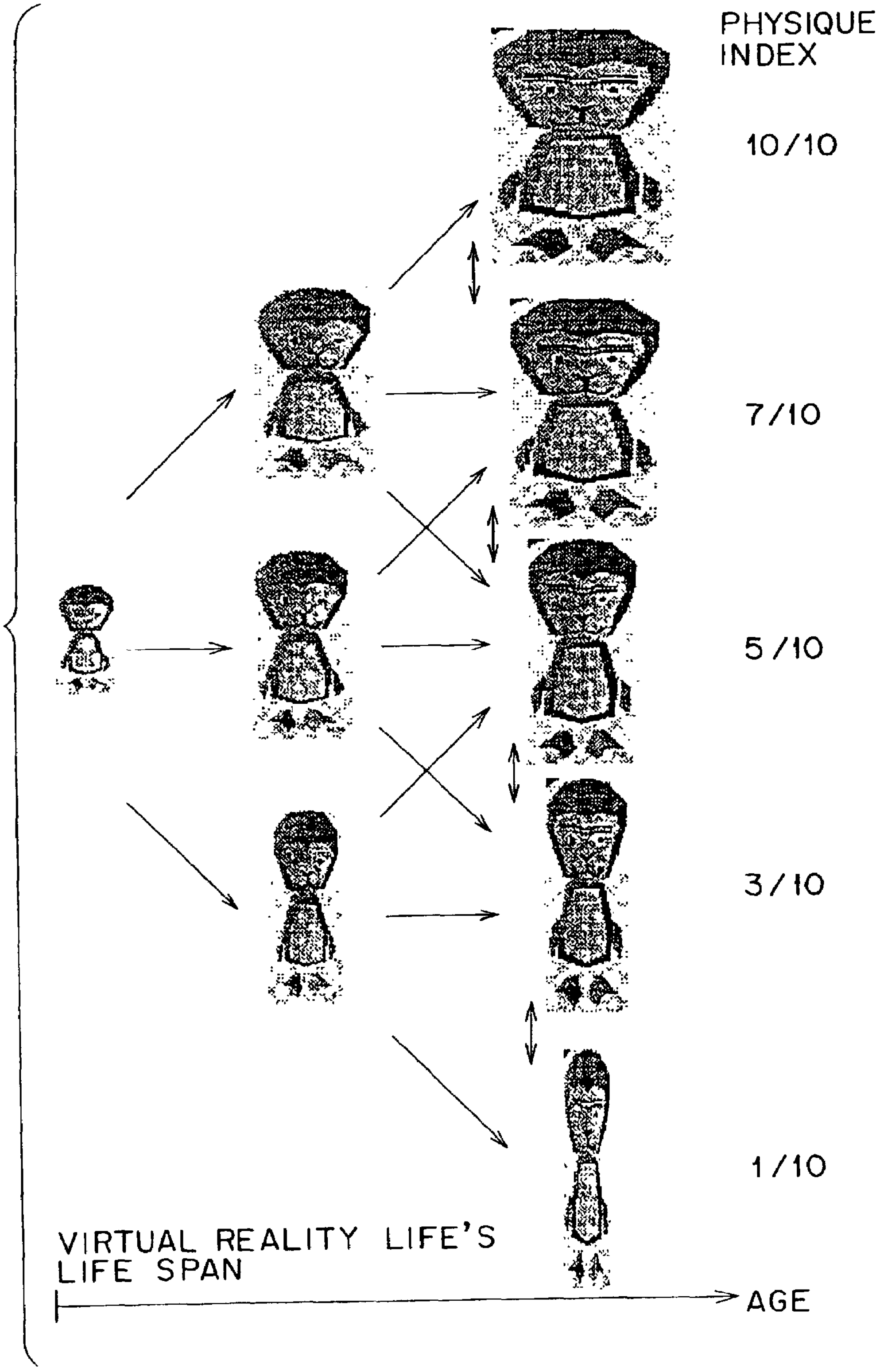
FIG. 13 is a diagram for describing virtual reality life object physique index.

FIG. 13 is a conceptual diagram in which the physique of a virtual reality pet is dynamically changed as the virtual reality pet grows and its physique index changes. As the virtual reality pet grows in age, its face becomes that of an adult and its physique becomes larger. If the physique index is small, the pet becomes thin; if it is large, the pet becomes thick.

Figure 14:
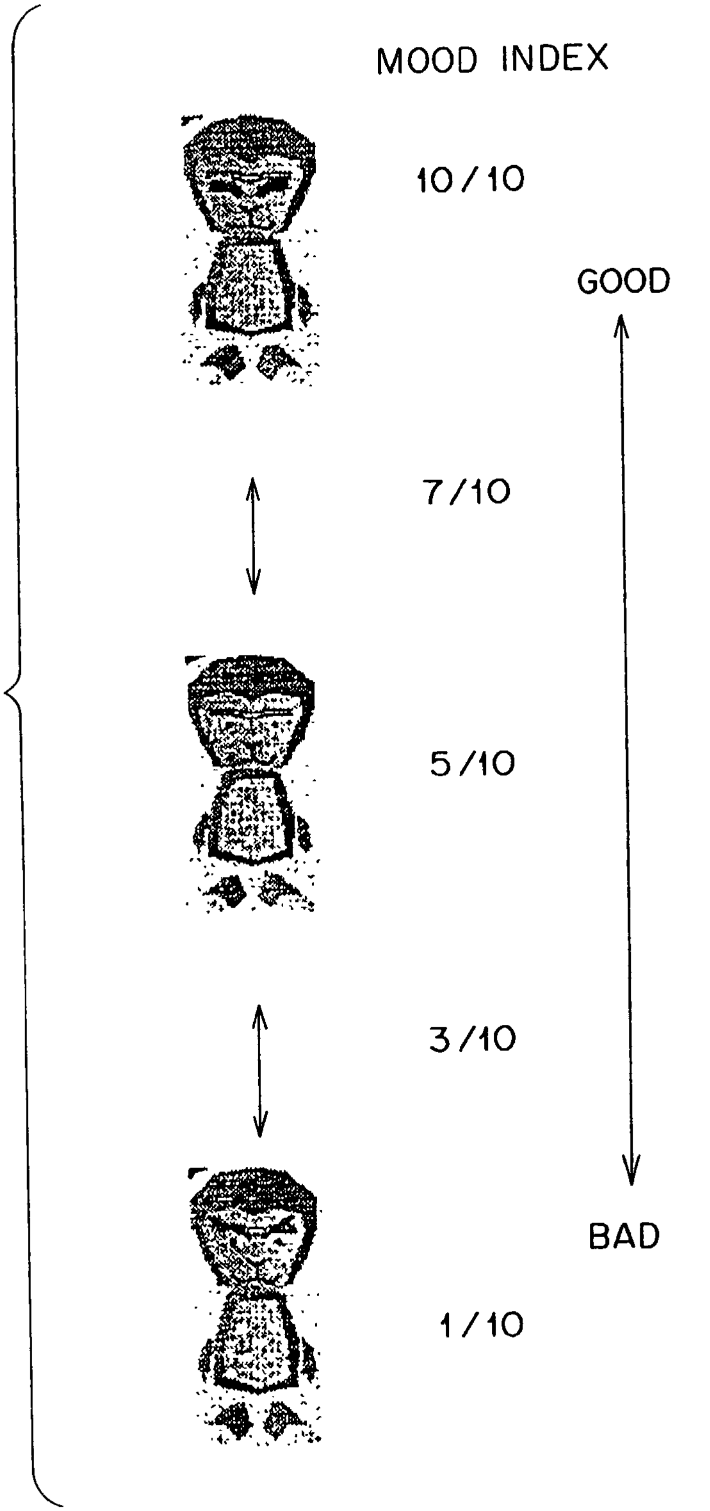
FIG. 14 is a diagram for describing virtual reality life object mood index.

FIG. 14 is a conceptual diagram in which the countenance of the virtual reality pet is dynamically changed as its mood index changes. When the mood index is high, the face of the virtual reality pet smiles; when it is low, an angry expression appears on the face.

Figure 15:
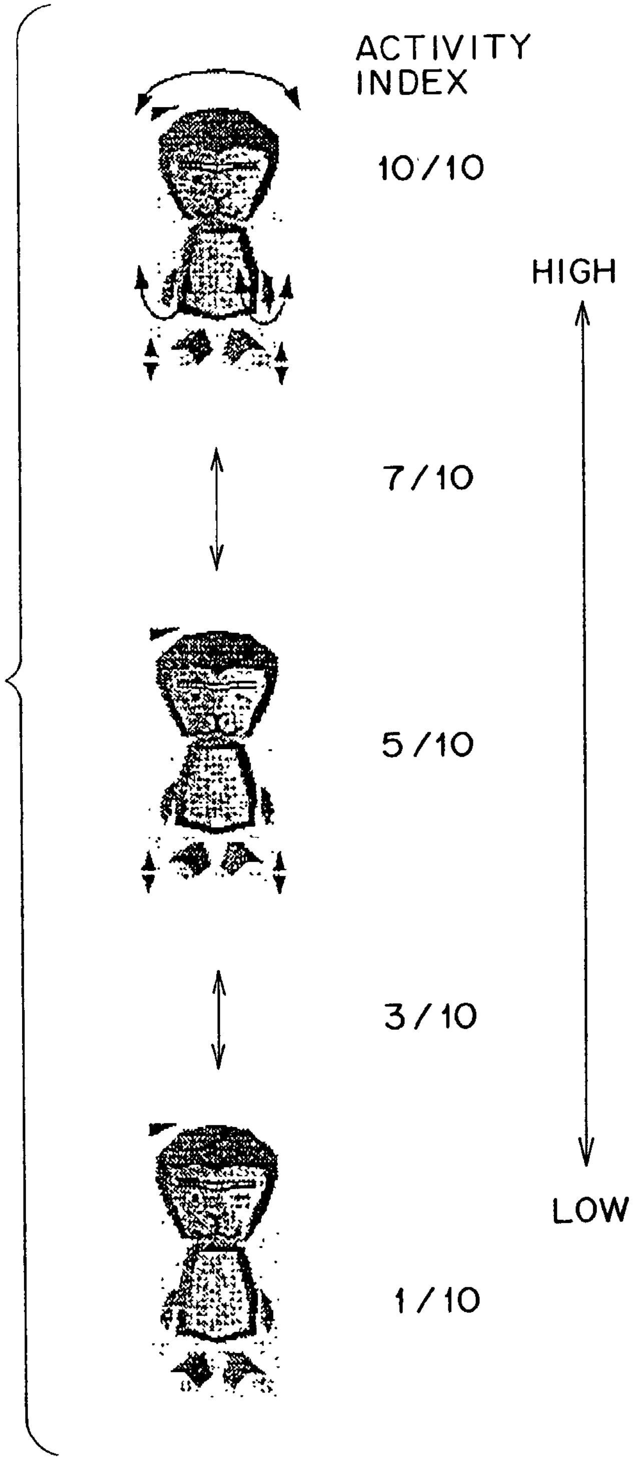
FIG. 15 is a diagram for describing virtual reality life object activity index.

FIG. 15 is a conceptual diagram in which the behavioral sequence of each part of the virtual reality pet is dynamically changed as the activity index of the virtual reality pet changes. When the activity index is low, only a small movement such as bending of knees; when it high, the virtual reality pet can wave its arms or shake its head for example.

Figure 16:
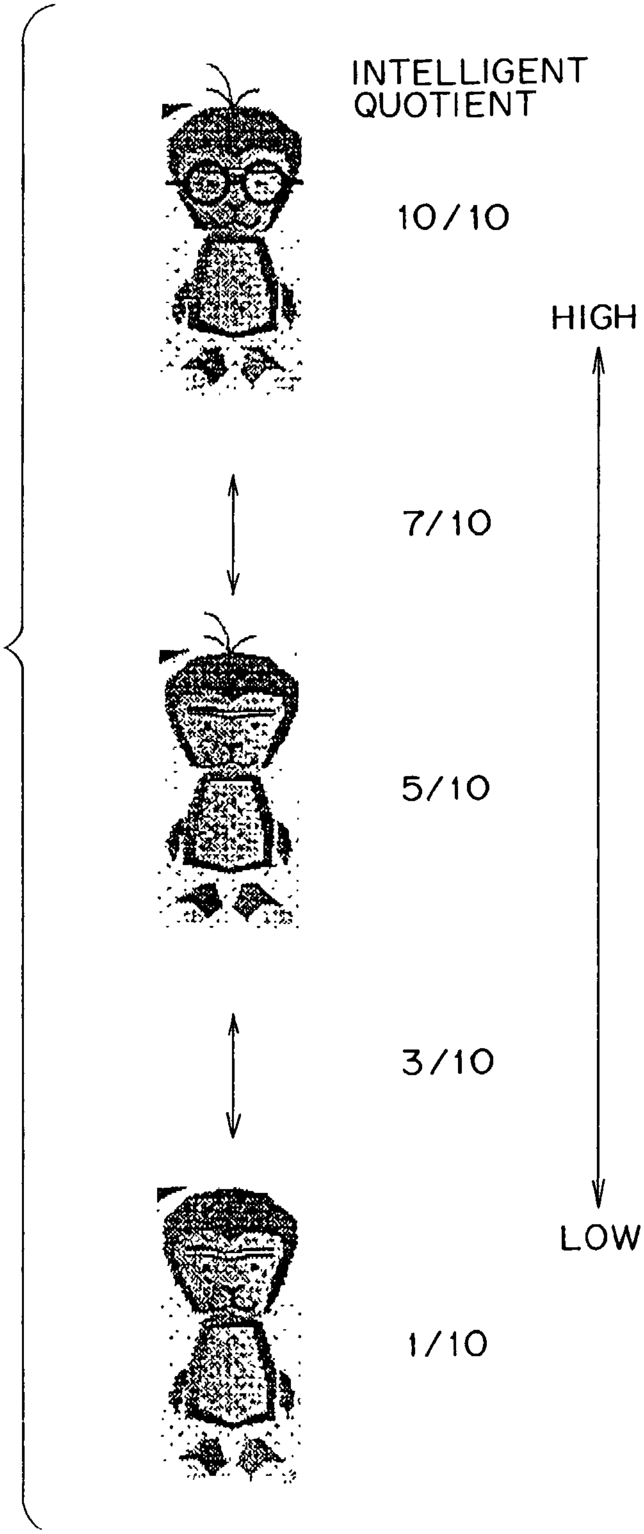
FIG. 16 is a diagram for describing virtual reality life object intelligent quotient.

FIG. 16 is a conceptual diagrams in which hair is added to the virtual reality pet or glasses are put on it as the intelligence quotient of the virtual reality pet changes.

The intelligence quotient, one of the growth parameters, is incremented by 0.1 point based on the access event caused by the operation of the calling button A shown in FIG. 9, thereby changing the appearance of the virtual reality pet as shown in FIG. 16.

The language index is incremented by 0.1 point according to the increasing age of the virtual reality pet based on the access event caused by the operation of the call button A shown in FIG. 9 or the timer event, thereby changing the style of text in chat sentence editing processing. For example, chat of a virtual reality pet having a small point is performed using hiragana or katakana Japanese syllabary and a chat of a virtual reality pet having a large point is performed using text including kanji Chinese characters.

The sociability index is incremented or decremented by 0.1 point according to the frequency of chat with the keeper. If the frequency is high, sociability increases; if it is low, sociability decreases. A virtual reality pet having a sociable and positive character takes on good attitude and countenance. Conversely, a virtual reality pet having an introvert and negative character takes on poor attitude and countenance.

The independence index is incremented by 0.1 point as a virtual reality pet ages based on timer event, gradually becoming independent of the keeper, rejecting commands of the keeper for example.

The activity index is determined based on the age, appetite index, and health index, affecting the behavior of a virtual reality pet as shown in FIG. 15. Also, the activity index is incremented by 0.1 point based on the event caused by operating the play button E shown in FIG. 9, affecting the behavior of the virtual reality pet such as gradually quickening getaway. The weight of the virtual reality pet is decreased to decrement its physique index, dynamically changing its appearance as shown in FIG. 13.

The mood index is determined by the access event caused by operating the call button A shown in FIG. 9 and the access frequency based on timer event, thereby affecting the countenance of a virtual reality pet as shown in FIG. 14.

On the other hand, the keeper data in the growth parameter control table shown in FIG. 8 is composed of the name of the keeper, a means (or method) for making contact with the keeper, and the address of the contact.

If the contacting means is 0, contact to the keeper is performed by a message statement through electronic mailing via the Internet 7. If the contacting means is 1, contact to the keeper is performed by converting text data of a message statement into a voice by an automatic reading tool on the communication server 16 and inputting the voice into the analog telephone 18. If the contacting means is 2, contact to the keeper is performed by a message statement to the portable telephone terminal 23 by use of an electronic mail service based on the data transmission protocol of wireless communication. If the contacting means is 3, contact to the keeper is performed by a written document to the facsimile 19. If the contacting means is 4, contact to the keeper is performed by a message statement to the pager terminal 24.

The keeper data as described above is controlled to realize the capability of contacting the keeper by use of the existing communication infrastructure to be describe later and the capability of simplified operation of a virtual reality pet by use of the existing communication infrastructure.

The above-mentioned system is summarized as follows. Namely, the growth parameter (indicative of outer growth or inner growth (personality)) of a virtual reality life object existing in a shared virtual reality space is controlled by the AO server 13, this growth parameter changing with occurrence of a predetermined event (an event caused by a user operation or passing of predetermined time). Based on the growth parameter transferred from the AO server 13, the script for dynamically changing one or both of the appearance (shape, attitude, size, or color) and the behavioral sequence of the virtual reality life object is interpreted to display the virtual reality life object according to the growth parameter on the client PCs 1 and 2.

The AO server 13 for controlling the autonomous behavior of a virtual reality life object existing in a shared virtual reality space is provided with a control table for controlling growth parameters for the virtual reality life object that change with occurrence of a predetermined event (an event caused by a user operation or passing of a predetermined time). A growth parameter read from the control table upon request from a client or occurrence of a predetermined demand is sent to one or both of the requesting client and another client.

As described above, the growth parameter is a value indicative of the degree of external growth to be calculated based on the occurrence of a predetermined event (an event caused by a user operation or passing of a predetermined time) from the birth of a virtual reality life object. Therefore, the outer growth parameter defines the outer change of a virtual reality creature or a virtual reality pet (AO) according to the age from baby to grown-up to aged.

The growth parameter is also a value indicative of the degree of inner growth (character) to be calculated based the occurrence of a predetermined event (a user operation or passing of a predetermined time) for a virtual reality life object. For example, a virtual reality life object having a sociable and positive character takes on good attitude and countenance. Conversely, a virtual reality life object having a dark and negative character takes on bad attitude and countenance. Thus, the change in the character of a virtual reality creature or a virtual reality pet (AO) is specified by the inner growth parameter.

For the inner growth parameter, a different value is calculated according to the type of an event for a virtual reality life object, updating the degree of the inner growth. If the character of a virtual reality pet for example is controlled by the AO server 13, 0.1 point is added to a predetermined index of the growth parameter according to the type of a message sent from each client; for example, every time the virtual reality pet is talked to in chat. Every time, the virtual reality pet is praised by pressing of the praise button D, 0.2 point is added. Every time the virtual reality pet is scolded by pressing of the scold button F, 0.2 point is subtracted from the predetermined index. Thus, the calculation is performed based on predetermined arithmetic equations.

The AO server 13 for controlling the autonomous behavior of a virtual reality life object in a shared virtual reality space is provided with a growth parameter control table indicative of the degree of growth of each virtual reality life object. This control table holds the birth date of each virtual reality life object. Based on the elapsed time starting from this birth date, the growth parameter according to the age of each virtual reality life object is calculated. The control table is updated by the newly calculated growth parameter.

The autonomous behaviors of plural virtual reality life objects in a shared virtual reality space are independently controlled by the AO server 13 (the single AO server 13 may control plural growth parameter control tables or the AO server 13 and the AO server 14 may control the plural control tables separately). Thus, the growth parameter control tables indicative of the growth degrees of different virtual reality life objects may be provided separately to control the growth parameters of the different virtual reality life objects independently.

In addition, various applications such as described below for example are possible.

For example, the AO server 13 for controlling the autonomous behavior of a virtual reality life object in a shared virtual reality space may be provided with a control table for controlling the ID (a nickname for example of the virtual reality life object set by user) of a client who has accessed the virtual reality life object (the control items of this control table may be included in the growth parameter control table or this control table may be provided independently). Based on this control table, an event indicative of an intimacy emotional expression may be started according to the access by the client having this ID. Thus, holding the degree of intimacy (access count and contents) on the AO server 13 can realize a pet (virtual reality life) object that approaches its keeper when the keeper has entered the world (the shared virtual reality space).

The ID of a client who has set or reset a virtual reality life object may be stored in the growth parameter control table as the keeper of this virtual reality life object. Updating of this ID is disabled until the life of the virtual reality life object expires. At the time of the expiration, this ID may be deleted. This can realize a virtual reality pet that is loyal to its keeper who has given birth to it (namely set it in the shared virtual reality space). Further, when the life of a virtual reality life object expires (namely, it is reset), a child of this virtual reality life object may be automatically generated and the ID of the keeper of its parent may be set to this child. This makes the child pet be also loyal to the keeper of its ancestor.

The AO server 13 may be provided with a history control table for controlling the history of a client who has set or reset a virtual reality life object. The client higher in access frequency than other clients can start a behavioral sequence indicative of more intimate emotional expression. As the access frequency lowers, the degree of intimacy lowers, thereby realizing a whimsical pet of which degree of intimacy changes with access frequency.

If the movement of a virtual reality life object is controlled according to the position of client in a shared virtual reality space, the virtual reality life object immediately appears just in front of the client (keeper) when the client enters the shared virtual reality space, thereby realizing the virtual reality life object that always follows its keeper about.

An intimate expression of feelings may be realized by making a virtual reality life object periodically report an event in a shared virtual reality space (for example, an event of being fed by another client) to its client through a text-based chat window.

Experience of an event in a shared virtual reality space may be reported from the virtual reality life object to the client through a voice chat to provide an intimacy emotional expression. Alternatively, this report may be made through a voice chat capability as an analog voice message based on text-to-voice conversion supported by text reading software. Alternatively still, several types of voice messages may be sampled and compressed to be stored as digital voice compressed data in the hard disk (of the AO server 13 or the client PC 1). Then, an optimum voice message is selectively read from the hard disk, decompressed, and reported to the client as an analog voice message through the voice chat capability. For the conversion between text and voice, the technology disclosed in Japanese Patent Laid-open No. 09-214486 corresponding to U.S. application Ser. No. 08/789,083 is available.

The following describes the capability of notification to the client based on an existing communication infrastructure and the capability of simplifying the operation of a virtual reality pet based on an existing communication infrastructure.

For example, if the appetite index of a virtual reality life object increases or its remaining life time goes below a predetermined value, the virtual reality life object (the AO server 13) notifies, through the mail server 15 or the communication server 16, its keeper at the keeper's address of contact of this change by use of the contacting means (FIG. 8) previously set to the growth parameter control table. If the keeper cannot immediately access the personal computer under situations that the keeper is away from the personal computer or the personal computer itself is malfunctioning for example, the keeper can later check requests of the virtual reality pet and make communication with it.

On the other hand, a service provider for providing services for virtual reality pet breeding such as described so far can evoke a motivation of a kind that the user must soon access the virtual reality pet. This provides a by-product that the service provider can ensure regular access, contributing to its stable management.

The following describes a particular example for realizing the above-mentioned notification capability based on an existing communication infrastructure.

The communication server 16, one of the servers for controlling the autonomous behavior of a virtual reality life object in a shared virtual reality space, is provided with a communication control table (a table corresponding to the keeper data in the growth parameter control table shown in FIG. 8) for controlling the type of a message notification means (or a message notification method) for making notification to the user, or the keeper of each virtual reality life object and controlling the address of contact of the keeper. As the state of the virtual reality life object changes (the communication server 16 is notified of this change by the AO server 13), the message is sent to the address of contact by use of the communication means registered in the communication control table. This allows actual communication from the shared virtual world to the real world.

The ID for identifying each user, or the keeper of each virtual reality life object and the history access by the user having this ID are controlled by this communication control table. Based on the access history, a message "I miss you" for example may be sent to a user who has not accessed his or her virtual reality life object for over a certain period.

Further, based on the access history, an optimum message statement may be selected from among plural message statements. The day after the day on which access has been made by the user, a message "Thank you for playing with me. Let's play again" for example may be sent from the virtual reality life object to its keeper. If no access has been made for over one week for example, a message "Are you busy these days? Please come to play with me sometimes" for example is sent.

A transition in the state of a virtual reality life object is sensed based on the updated content of the growth parameter control table, an optimum message statement is selected from among plural message statements, and the selected message is sent. For example, the day after the day on which the virtual reality life object has been fed much, a message "I'm still full" for example is sent. If no access has been made for one week for example, a message "I'm starving to death" for example is sent. In a scenario in which a virtual reality life object is aged one year in one week, its birthday comes every week and a message "I have become 10 years old today. Please look at grown-up me" for example is sent. If the allocated remaining life time is nearly expiring, a message "I have to go somewhere far away soon. Please be with me when I die" for example is sent.

The mail server 15 may be provided with a part of the communication control table associated with electronic mail to send a text-based message to the keeper of each virtual reality life object at his or her electronic mail address (including his or her ID) by the communication control table of the mail server 15.

In addition to an electronic mail transmitted through the Internet 7, a message may be sent from the communication server 16 through the public telephone network 17 to the portable telephone terminal 23 based on wireless communication or to the pager terminal 24 to be displayed on the LCD of the wireless telephone terminal or the pager.

Alternatively, the telephone number (including the ID) of the user of each virtual reality life object may be controlled by the communication control table to automatically call the user at his or her registered telephone number from the communication server 16, thereby sending a voice message. In this case, this notification may be made as an analog voice message based on text-to-voice conversion supported by text reading software through the ordinary telephone 8 or the portable telephone terminal 23. Alternatively, several types of voice messages may be sampled and compressed to be stored as digital voice compressed data in the hard disk (of the AO server 13 or the client PC 1) Then, an optimum voice message is selectively read from the hard disk, decompressed, and reported to the client as an analog voice message.

The facsimile number (including the ID) of the user of each virtual reality life object may be controlled by the communication control table to automatically call the user at this facsimile number, thereby sending a message to the facsimile 19.

Further, by use of a terminal such as the telephone 18 that has received the above-mentioned message from the virtual reality pet, two-way communication may be made between the keeper and its virtual reality pet from this terminal by a simplified operation.

The following describes a particular example of realizing the capability of performing a simplified operation on a virtual reality pet by use of an existing communication infrastructure.

For example, the shared server 12 can interpret an operation command returned with the ID (caller ID) of the user through the portable telephone terminal 23 or the telephone 18, recognize the operation command as a message to the corresponding virtual reality life object, send the message to the AO server 13, and reflect the content of the message onto the state transition (updating of a growth parameter) of the virtual reality life object.

For the above-mentioned returned operation command, a DTMF (Dual-Tone Multi-Frequency) signal that is generated when a push button on the telephone 18 is pressed for example may be used.

In addition, by use of Web-On-Call (registered trademark) voice browser by NetPhonic Communications Inc. for example, various notifications to a virtual reality pet may be made. This voice browser allows access to servers from the ordinary telephone 18 by voice. This voice browser has a text reading capability, so that a mail from a virtual reality pet can be heard in voice. Moreover, this voice browser can also send text by facsimile or electronic mail.

It should be noted that the shared server 12, the AO servers 13 and 14, the mail server 15, and the communication server 16 execute various capabilities in a shared manner, thereby realizing a service for providing a shared virtual reality space to client PCs as a whole system.

The following describes a chat capability to be executed in this shared virtual reality space. Chat is classified into public chat and personal chat. In public chat, conversation uttered by one client (user) at a predetermined location in the shared virtual reality space is transmitted to other nearby clients (users).

In personal chat, conversation is made only with a specified party. This specification is performed by clicking the mouse button on a desired virtual reality life object while pressing the shift key of the keyboard 42 for example. When the other party of chat is specified, chat made by the client who has made that specification is directed only to the specified party.

In voice chat, contents of chat are transmitted in a voice signal; in text chat, they are transmitted in text. In voice chat, voice data captured by the microphone 36 is transmitted to the clients (users) nearby or specified virtual reality life objects to be sounded from the speakers 37 and 38 of the PCs of these clients.

In text chat, text entered from the keyboard 42 is transmitted also to the clients (users) of nearby or specified virtual reality life objects to be displayed on the CRT monitor 45 of the client PCs.

The user can select between voice chat and text chat as required.

Figure 17:
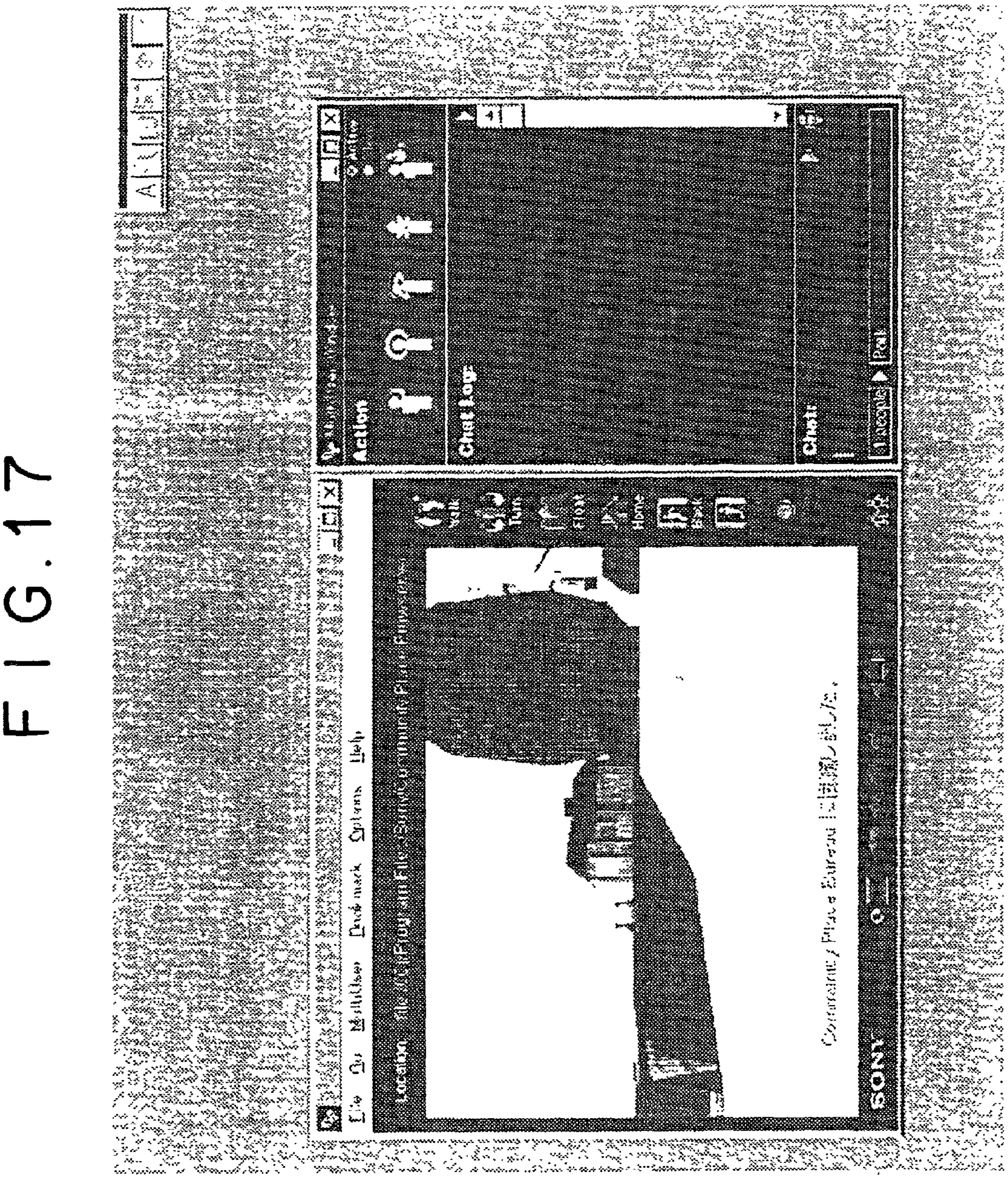
FIG. 17 is a display photograph for describing an example of a shared virtual reality space.

The following describes particular display examples that appear on the CRT monitor of a client PC. FIG. 17 shows a display example on the CRT monitor 45 to be displayed when the client PC 1 accesses the shared server 12. In this example, message "Connected to Community Place Bureau" is superimposed on an image of three-dimensional shared virtual reality space. It should be noted that a chat content display area "Chat Log:" and various action buttons are disposed on the right side of this screen.

Figure 18:
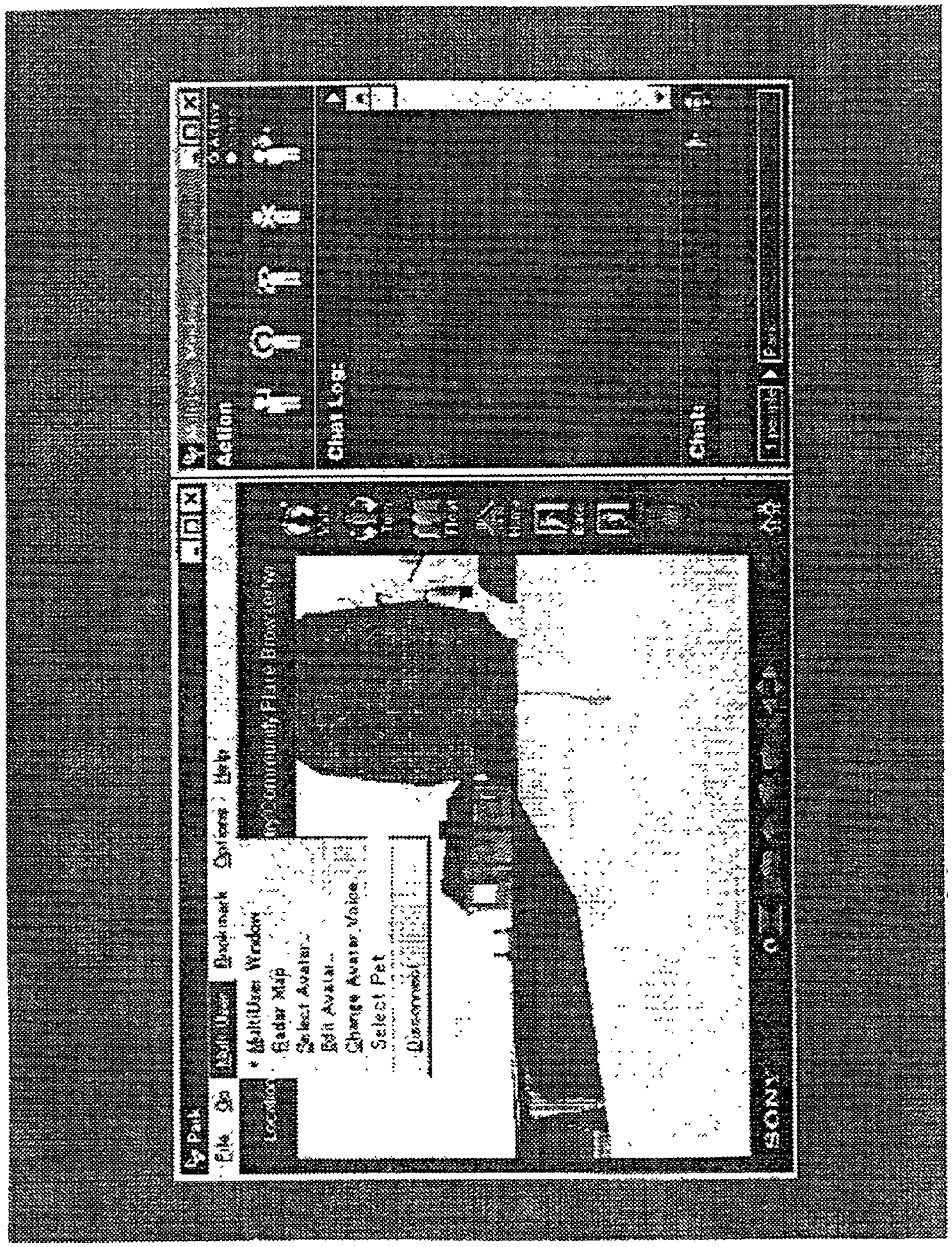
FIG. 18 is a display photograph for describing another example of the shared virtual reality space.
Figure 19:
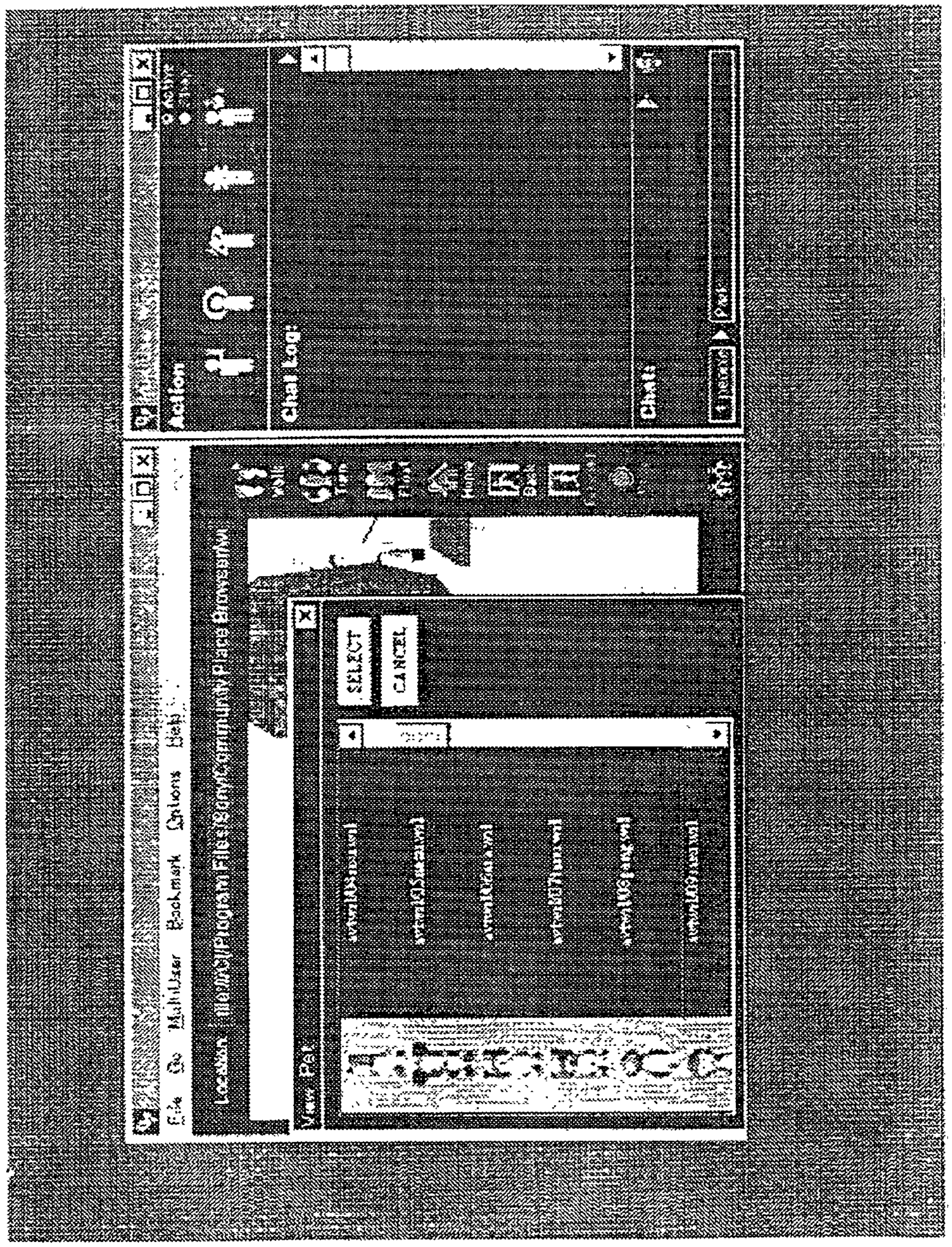
FIG. 19 is a display photograph for describing still another example of the shared virtual reality space.

To select a virtual reality pet to be reared in the shared virtual reality space, the client clicks "Multi User" item in the screen. When this item is clicked, a menu bar appears as shown in FIG. 18. From the menu bar, the client selects "Select Pet." Then, "View Pet" window appears as shown in FIG. 19, in which various virtual reality pet images are displayed. The client selects a desired one of these virtual reality pets. It should be noted that the images of virtual reality pets displayed in the "View Pet" window are the initial images, namely the images at their births. As described earlier, the image of each virtual reality pet gradually changes as it grows. After the selection, the client presses the "SELECT" button with the mouse 41.

Figure 20:
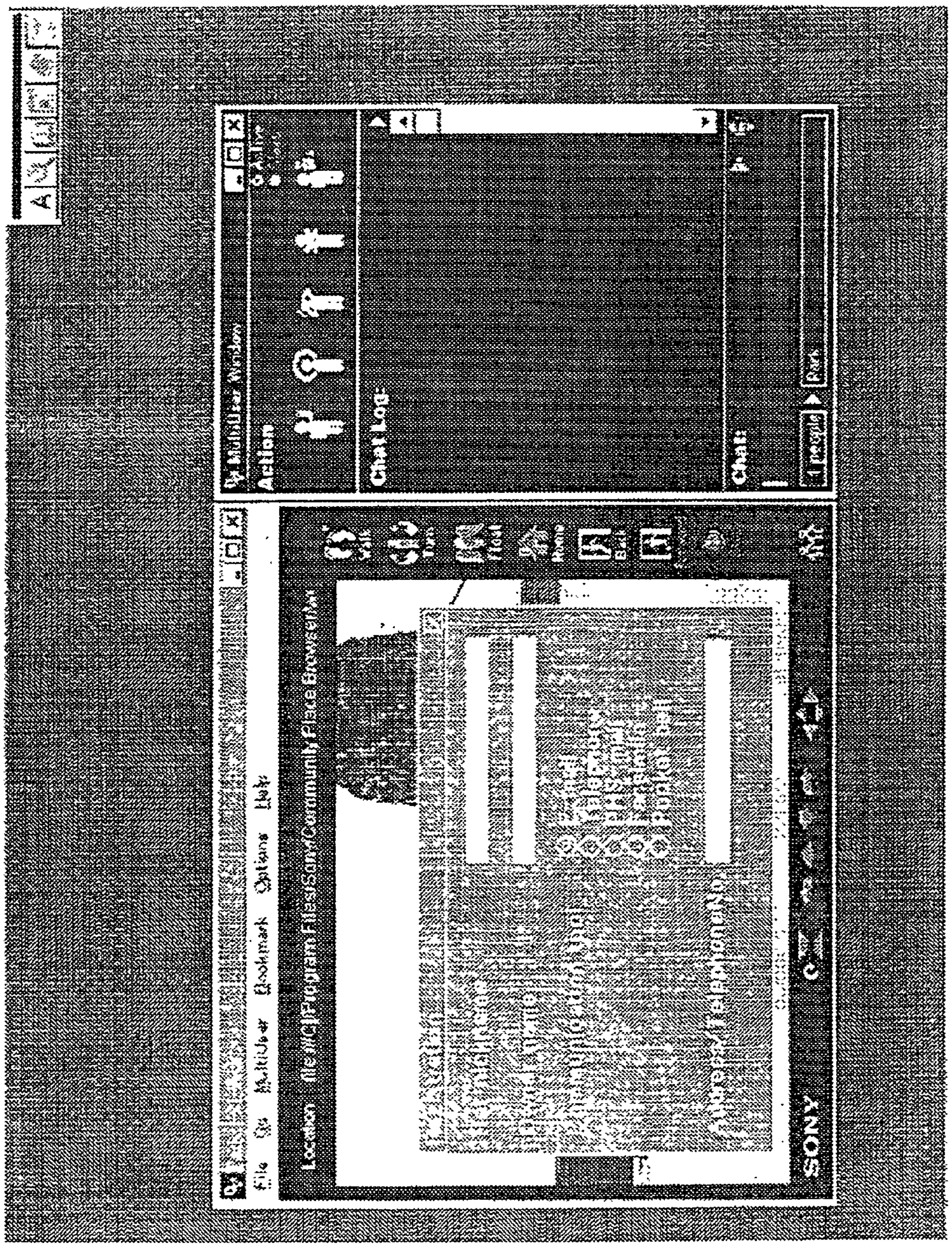
FIG. 20 is a display photograph for describing yet another example of the shared virtual reality space.

When the selection of the virtual reality pet has been completed, a window "Registration" for registering the information about the selected virtual reality pet appears as shown in FIG. 20. The client enters the name of the virtual reality pet "Pet Nickname," the name of the owner (keeper of the pet) "Owner Name," and the address and telephone number "Address/Telephone No." of the owner from the keyboard 42.

Further, the client selects a communication tool as the above-mentioned contacting means or notification means from "E-mail," "Telephone," "PHS-mail (wireless communication mail)," "Facsimile," and "Pocket Bell (pager)."

Figure 21:
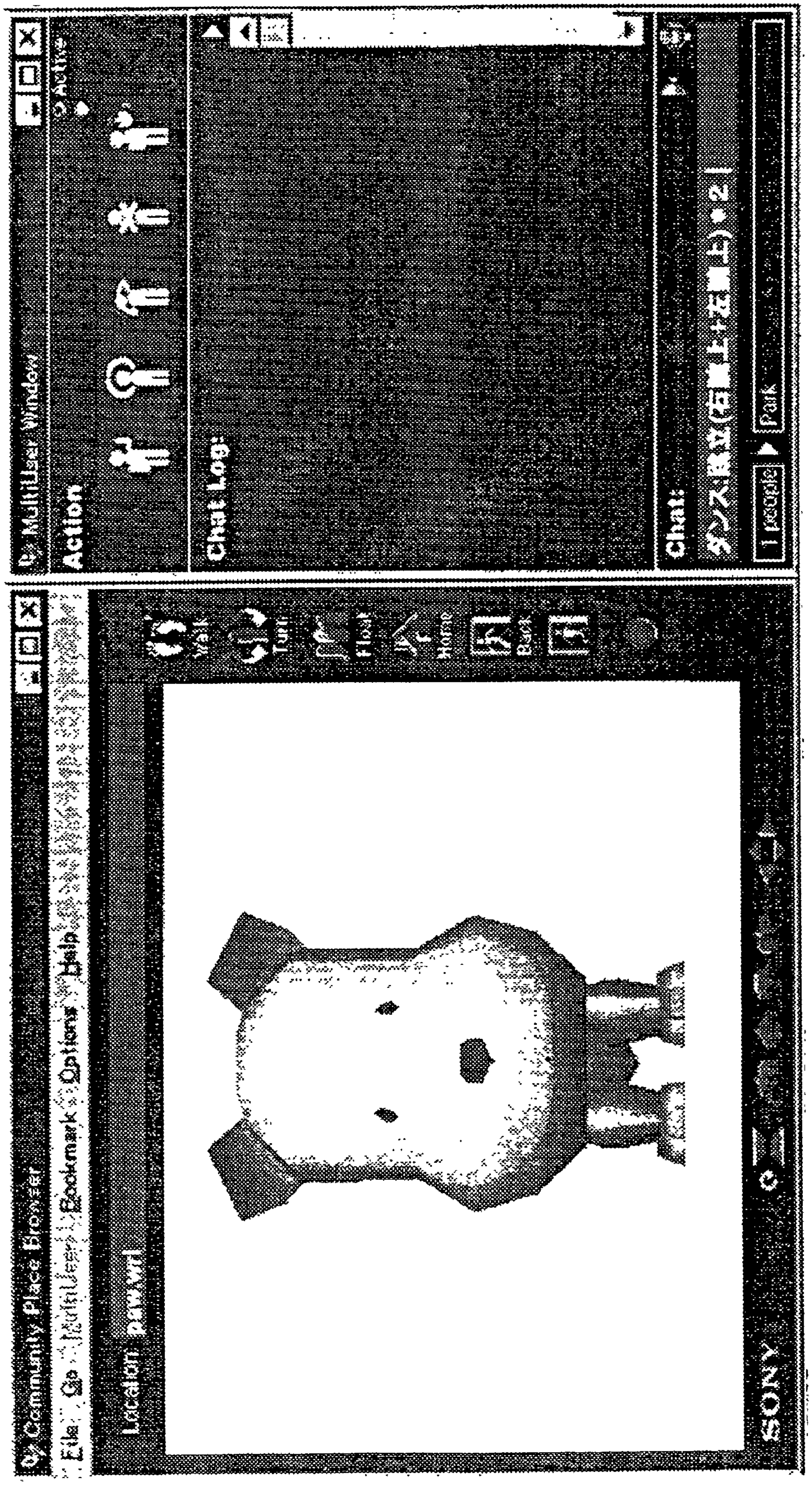
FIG. 21 is a display photograph for describing a different example of the shared virtual reality space.
Figure 22:
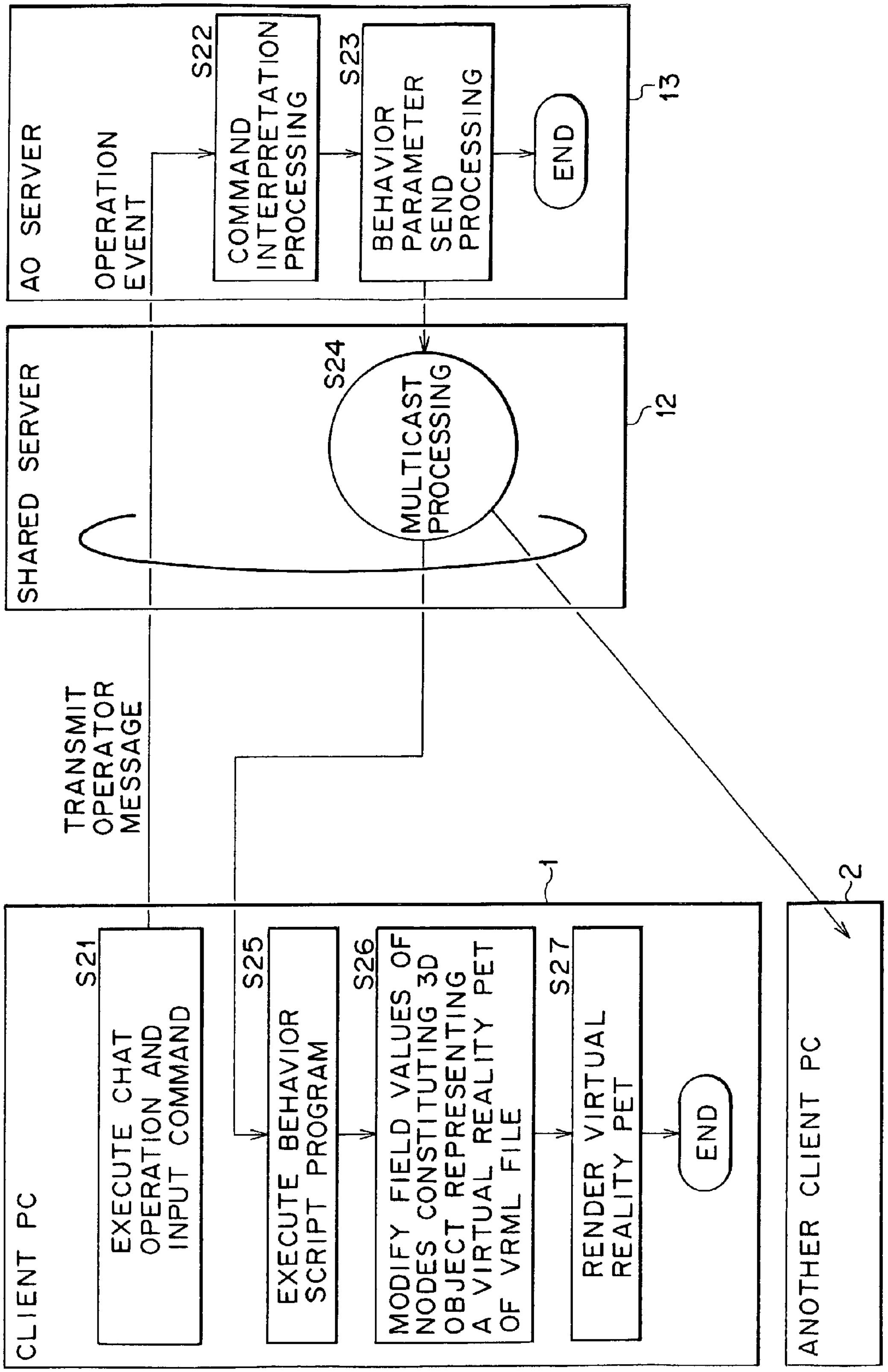
FIG. 22 is a diagram illustrating the passing of a dance command.

FIG. 21 shows an example in which a dog for example has been selected as the virtual reality pet. As described earlier, this virtual reality pet (dog) grows based on growth parameters to be updated by various events. The following describes an example in which the virtual reality pet dances as these events with reference to the flowchart of FIG. 22.

First, the keeper instructs the virtual reality pet to dance by entering a command made up of a combination of a word (kanji) and a symbol into the chat window disposed in the lower right of the screen as shown in FIG. 21 in step S21. The inputted command is sent to the AO server 13 through the shared server 12. The command is then interpreted by the AO server 13 based on the behavior command control table (FIG. 7) in step S22. An example of this behavior command control table is shown below, in which the left column denotes the commands to be entered by the keeper and the right column denotes the movements to be performed by the virtual reality pet.

| | |
|---|---|
| * (half-width character also permitted) | Repeat a command. |
| +(half-width character also permitted) | Execute commands simultaneously. |
| 1 through 9 | The number times a command is to be executed repeatedly. |
| ( )(half-width character also permitted) | Put commands in group. |
| Left | Move to the left 1 meter in parallel. |
| Right | Move to the right 1 meter in parallel. |
| Front | Move forward 1 meter in parallel. |
| Back | Move backward 1 meter in parallel. |
| Walk | Make a walking movement at a particular position. |
| Run | Make a running movement at a particular position. |
| Jump | Make a jumping movement at a particular position. |
| Stand | Stand up on the hind legs. |
| Headstand | Stand on forefeet. |
| Sleep | Sleep lying. |
| Sit | Sit down. |
| Lie | Get down on all fours. |
| Shake | Offer a forefoot. |
| Turn | Turn 90 degrees (counterclockwise) without shifting position. |
| Full turn | Turn 360 degrees (clockwise) without shifting position. |
| Roll | Roll. |
| Die | Play dead. |
| Love | Make a courtship behavior. |
| Tail | Make a wag. |

-continued

| | |
|---|---|
| Waist | Shake waist left and right once. |
| Fold arms | Fold forelegs. |
| Nod | Nod. |
| Shake head | Shake head in the negative. |
| Summer | Dance the hula. |
| Right arm | Specify right forefoot. |
| Left arm | Specify left forefoot. |
| Right leg | Specify right hind leg. |
| Left leg | Specify left hind leg. |
| Up | Move up specified part. |
| Down | Move down specified part. |
| Side | Move up specified part up to horizontal level. |

Each command is composed of a combination of human-understandable characters and symbols. If the keeper enters "Dance: Jump Stand (Right arm Up+Left arm Up) * 2) for example in step S21, this command is interpreted in the AO server 13 in step S22. The AO server 13 references the behavior command control table and interprets the command as follows.

First, "Dance:", denoting that a dance command follows, is a control identifier for making distinction from a normal conversation (chat) with a virtual reality pet or another avatar (user) accessing a shared virtual reality space. Having detected such a control identifier in a chat text transmitted from a client, the AO server 13 interprets the subsequent command. In this example, "Jump" denotes a jump at a particular position, "Stand" denotes standing on the hind legs, the opening parenthesis "(" denotes the start of grouping, "Right arm" specifies the right forefoot, "Up" denotes raising of the right forefoot, "+" denotes a subsequent motion to be performed with the right forefoot raised, "Left arm" denotes raising of the left forefoot, the closing parenthesis ")" denotes the end of grouping, and "*2" denotes that the grouped motion is to be repeated twice.

The AO server 13 sends a script for specifying the motions to be performed by the virtual reality pet based on the interpreted command to the shared server 12 in step S23. The shared server 12 transfers the received script to the client PC 1, which is the keeper of the virtual reality pet, and the client PC 2 sharing the virtual reality space by means of multicast processing in step S24.

Based on the received motion parameter (namely the script), the client PC 1 executes a dance script program written with a processing procedure for controlling the behaviors such as dance of the virtual reality pet in step S25, the field values of the nodes forming the 3D object representing the virtual reality pet are modified in step S26, the virtual reality pet resulted from the modification is rendered in step S27, and the rendered virtual reality pet is displayed in the main window of the VRML browser on the CRT monitor 45 of the client PC 1.

Figure 23:
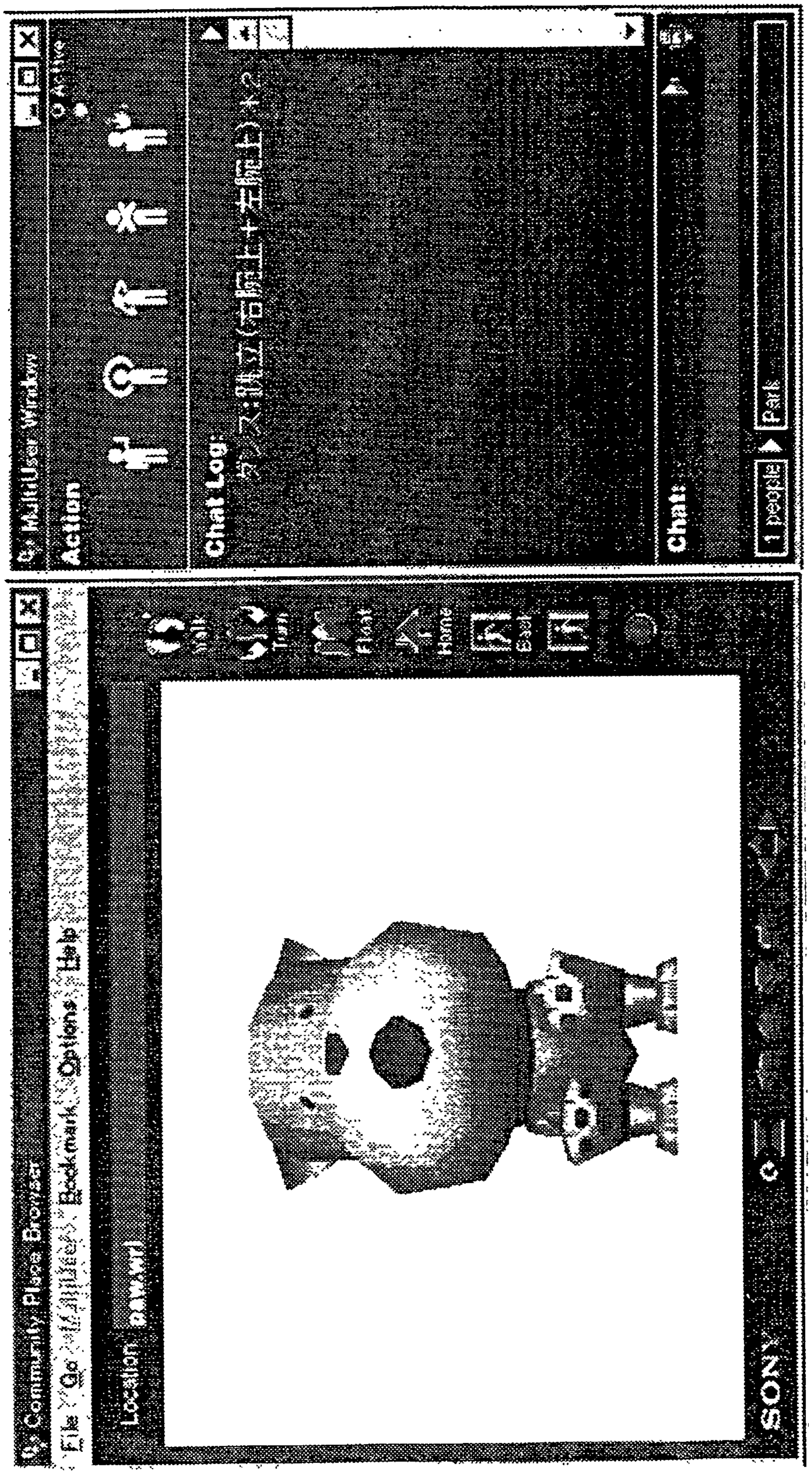
FIG. 23 is a display photograph for describing an example of a shared virtual reality space.

Namely, in the command example shown in FIG. 21, a dog (the virtual reality pet) that jumps and stands on the hind legs and then raises both forefeet twice is displayed in the main window of the VRML browser on the CRT monitor 45 of the client PC 1. FIG. 23 shows a display example of a predetermined timing of the dog performing the above-mentioned motions. FIG. 23 also shows the entered and executed dance command in the Chat Log in which chat contents are written.

Normally, chat window is used for conversation with another user accessing the shared virtual reality space through the avatar, in which an inputted conversation sentence is transmitted to the AO server 13 through the shared server 12. The AO server 13 multicasts the received conversation sentence through the shared server 12. The client PC 1 and the client PC 2 display the received conversation sentence in the Chat Log of the chat window. In doing so, the command ("Dance" in this example) for executing a predetermined control instruction is transmitted from the client PC 1 and the client PC 2 to the AO server 13 in the same manner as a normal conversation sentence is transmitted. The AO server 13 interprets the received command and accordingly generates a script for making the virtual reality pet perform the specified motions and sends the generated script to the client PCs through the shared server 12.

Obviously, other commands than "Dance" may be prepared. For example, commands such as "Sit" and "Lie on all fours" to be generally given to a dog may be implemented by simply inputting these commands by words by means of a chat operation, making the virtual reality pet act accordingly. In addition, meaningless words may be inputted as commands to make a virtual reality pet perform meaningless movements.

A virtual reality pet may ignore a command issued by its keeper in some situations. For example, if the mood index as a growth parameter of a virtual reality pet is low (namely, the virtual reality pet is in a bad mood) or the intelligent quotient is low, the virtual reality pet may not respond to a given command.

Obviously, the commands that can be issued to a virtual reality pet are not limited to those listed above. The keeper may add his or her unique commands. Further, a dance contest may be held by gathering keepers in a shared virtual reality space and having their virtual reality pets dance.

In the above-mentioned embodiment, dedicated commands for making a virtual reality pet perform movements are prepared and, when one of these commands is located at the beginning of a sentence, a script for controlling the virtual reality pet is generated. It will be apparent that a word may be automatically extracted from a natural conversation of a user and, based on the extracted word, the script may be generated.

It will also be apparent that, by determining the nickname column in the growth parameter control table shown in FIG. 8, a script for controlling only an object (a virtual reality pet) responsive to a nickname may be generated. For example, when a command "Taro, Sit Down" is entered, the AO server 13 compares the command with the growth parameter control table and generates a script for controlling the object (the virtual reality pet) having the nickname corresponding to "Taro".

It should be noted that the medium for providing the computer program for executing the above-mentioned processing includes not only information recording media such as a magnetic disc and a CD-ROM but also networks such as the Internet and a digital satellite.

According to the above-mentioned embodiment, a client transmits a command to a server and receives a script for controlling the behavior of a virtual reality life object in response to the command from the server. Based on the script, display of the virtual reality life object on the client is controlled. Consequently, the novel constitution allows the virtual reality life object to perform complicated and unique movements.

Besides, a command issued by a client is interpreted by the server by referencing a table listing a relationship between commands and movements to be performed by a virtual reality life object and, based on an interpretation result, a script for controlling the displaying of the movement of the virtual reality life object in response to the command is transmitted from the server to the client apparatus. Consequently, the novel constitution can provides a shared virtual reality space in which a virtual reality life object can perform complicated and unique movements.

While the preferred embodiments of the present invention have been described using specific terms, such description is for illustrative purposes only, and it is to be understood that changes and variations may be made without departing from the spirit or scope of the appended claims.

What is claimed is:

1. An information processing method for receiving the provision of a virtual reality space from a server through a network, comprising steps of:

inputting at a client system a command within a chat message for making an object under control in said virtual reality space perform a predetermined movement;

sending from said client system said command to said server;

receiving at said client system a control instruction for controlling a behavior of said object under control from said server, wherein the control instruction is interpreted from the command inputted within the chat message;

receiving at said client system a growth instruction for controlling the growth of said object based on a growth table, remaining life time and a birth date associated with said object; and controlling at said client system, based on said control instruction, the displaying of said object under control, wherein said object under control is an object representing a virtual reality life object, and wherein said virtual reality space is a shared virtual reality space that is simultaneously accessed by a plurality of information processing apparatuses connected to said network, wherein said command is inputted within the chat message, and said control instruction is received, each time a movement of the object is requested.

2. The information processing method according to claim 1, wherein the command is extracted from a natural language conversation of a user in the chat message.

3. The information processing method according to claim 1, wherein said control instruction includes a plurality of operable control instructions and wherein a user who inputs said command at said client system previously associated said command with said control instructions by entering a second command which included said command and said plurality of operable control instructions and wherein in response to said user previously entering said second command, said command was previously received at said client system.

4. The information processing method according to claim 1, including sending from said server the control instruction based on a growth parameter associated with said object.

5. The information processing method according to claim 4, wherein the growth parameter is not associated with the command from the client system.

6. The information processing method according to claim 1, wherein the control instruction is an ignore command instruction.

7. An information processing apparatus connected to a server through a network for receiving the provision of a virtual reality space, the apparatus comprising:

a processor;

a memory device which stores a plurality of instructions, which when executed by the processor, performs the steps of:

inputting at a client system a command within a chat message for making an object under control in said virtual reality space perform a predetermined movement;

sending from said client system said command to said server;

receiving at said client system a control instruction for controlling a behavior of said object under control from said server, wherein the control instruction is interpreted from the command inputted within the chat message, and receiving at said client system a growth instruction for controlling the growth of said object based on a growth table, remaining life time and a birth date associated with said object; and controlling at said client system, based on said control instruction, the displaying of said object under control, wherein said object under control is an object representing a virtual reality life object, and wherein said virtual reality space is a shared virtual reality space that is simultaneously accessed by a plurality of information processing apparatuses connected to said network, wherein said command is inputted within the chat message and said control instruction is received each time a movement of the object is requested.

8. The information processing apparatus according to claim 7, wherein when executed by the processor, the plurality of instructions cause the processor to perform the step of sending from said server the control instruction based on a growth parameter associated with said object.

9. The information processing apparatus according to claim 8, wherein the growth parameter is not associated with the command from the client system.

10. The information processing apparatus according to claim 7, wherein the script for controlling a behavior is an ignore command script.

11. An information processing method comprising:

inputting at a client system a command within a chat message for making an object under control in said virtual reality perform a predetermined movement;

sending from said client system said command to said server;

receiving at said client system a script for controlling a behavior of said object under control in response to said command from said server, wherein the script is interpreted from the command inputted within the chat message;

receiving at said client system a growth instruction for controlling the growth of said object based on a growth table, remaining life time and a birth date associated with said object; and controlling at said client system, based on said script, the displaying of said object under control, wherein said object under control is an object representing a virtual reality life object, and wherein said virtual reality space is a shared virtual reality space that is simultaneously accessed by a plurality of information processing apparatuses connected to said network.

12. The information processing method according to claim 11, including sending from said server the script based on a growth parameter associated with said object.

13. The information processing method according to claim 12, wherein the growth parameter is not associated with the command from the client system.

14. The information processing method according to claim 11, wherein the script for controlling a behavior is an ignore command script.

15. An information processing method for providing a virtual reality space to a client terminal connected through a network, comprising steps of:

receiving from said client terminal a command within a chat message associated with a predetermined movement to be performed by an object under control in said virtual reality space from said client terminal;

interpreting said command within the chat message received by said receiving step by referencing a table listing a relationship between said command and said predetermined movement to be performed by said object under control;

transmitting to said client terminal a growth instruction for controlling the growth of said object based on a growth table, remaining life time and a birth date associated with said object; and transmitting to said client terminal a control instruction for controlling the displaying of said object under control based on a result of the interpretation by the interpreting step, wherein said object under control is an object representing a virtual reality life object, and wherein said virtual reality space is a shared virtual reality space that is simultaneously accessed by a plurality of information processing apparatuses connected to said network, wherein said command is inputted within the chat message and said control instruction is received each time a movement of the object is requested.

16. The information processing method according to claim 15, wherein the command is extracted from a natural language conversation of a user in the chat message.

17. The information processing method according to claim 15, wherein interpreting said command includes referencing a growth parameter associated with said object.

18. The information processing method according to claim 17, wherein the growth parameter is not associated with the command from the client terminal.

19. The information processing method according to claim 15, wherein the control instruction is an ignore command instruction.

20. An information processing apparatus for providing a virtual reality space to a client terminal connected to said information processing apparatus through a network, the apparatus comprising:

a processor;

a memory device which stores a plurality of instructions, which when executed by the processor, performs the steps of:

receiving from said client terminal a command within a chat message associated with a predetermined movement to be performed by an object under control in said virtual reality space from said client terminal;

storing a table listing a relationship between said command within the chat message and said predetermined movement to be performed by said object under control;

interpreting said command within the chat message received by said receiving means by referencing said table;

transmitting to said client terminal a growth instruction for controlling the growth of said object based on a growth table, remaining life time and a birth date associated with said object; and transmitting to said client terminal a control instruction interpreted from the command within the chat message for controlling the displaying of said object under control based on a result of the interpretation by the interpreting means, wherein said object under control is an object representing a virtual reality life object, and wherein said virtual reality space is a shared virtual reality space that is simultaneously accessed by a plurality of information processing apparatuses connected to said network, wherein said command within the chat message is inputted and said control instruction is received each time a movement of the object is requested.

21. The information processing apparatus according to claim 20, wherein interpreting said command includes referencing a growth parameter associated with said object.

22. The information processing apparatus according to claim 21, wherein the growth parameter is not associated with the command from the client terminal.

23. The information processing apparatus according to claim 20, wherein the control instruction is an ignore command instruction.

24. An information processing method for receiving the provision of a virtual reality space from a server through a network, comprising steps of:

inputting at a client system a command within a chat message for making an object under control in said virtual reality space perform a predetermined movement;

sending from said client system said command within the chat message to said server;

receiving at said client system a control instruction interpreted from the command within the text message for controlling a behavior of said object under control in response to said command from said server and receiving at said client system a growth instruction for controlling the growth of said object based on a growth table, remaining life time and a birth date associated with said object; and controlling at said client system, based on said control instruction, the displaying of said object under control, wherein said object under control is an object representing a virtual object behaving by an autonomous movement based on a parameter representing a status of the object, wherein said command within the chat message is inputted and said control instruction is received each time a movement of the object is requested.

25. The information processing method according to claim 24, wherein said command is a combination of a word and a symbol inputted into the chat message.

26. The information processing method according to claim 24, wherein said object under control is an object representing a virtual reality life object.

27. The information processing method according to claim 24, wherein said object under control is an object to which a controlling user is set.

28. The information processing method according to claim 24, wherein said virtual reality space is a shared virtual reality space that is simultaneously accessed by a plurality of information processing apparatuses connected to said network.

29. The information processing method according to claim 28, wherein said command is inputted through an input interface of one of said plurality of information processing apparatuses for transmitting a message to any other of said plurality of information processing apparatuses.

30. The information processing method according to claim 29, wherein said command comprises an identifier for making distinction from said message and information about a movement to be performed by said object under control.

31. The information processing method according to claim 24, wherein the command is extracted from a natural language conversation of a user in the chat message.

32. The information processing method according to claim 24, including sending from said server the control instruction based on a growth parameter associated with said object.

33. The information processing method according to claim 32, wherein the growth parameter is not associated with the command from the client system.

34. The information processing method according to claim 24, wherein the control instruction is an ignore command instruction.

35. An information processing apparatus connected to a server through a network for receiving the provision of a virtual reality space, the apparatus comprising:

a processor;

a memory device which stores a plurality of instructions, which when executed by the processor, performs the steps of:

inputting at a client system a command within a chat message for making an object under control in said virtual reality space perform a predetermined movement;

sending from said client system said command within the chat message to said server;

receiving at said client system a control instruction interpreted from the command within the chat message for controlling a behavior of said object under control in response to said command from said server and receiving at said client system a growth instruction for controlling the growth of said object based on a growth table, remaining life time and a birth date associated with said object; and controlling at said client system, based on said control instruction, the displaying of said object under control, wherein said object under control is an object representing a virtual object behaving by an autonomous movement based on a parameter representing a status of the object, wherein said command is inputted and said control instruction is received each time a movement of the object is requested.

36. The information processing apparatus according to claim 35, wherein when executed by the processor, the plurality of instructions cause the processor to perform the step of sending from said server the control instruction based on a growth parameter associated with said object.

37. The information processing apparatus according to claim 36, wherein the growth parameter is not associated with the command from the client system.

38. The information processing apparatus according to claim 35, wherein the control instruction is an ignore command instruction.

39. An information processing method comprising:

inputting a command within a chat message at a client system for making an object under control in said virtual reality space perform a predetermined movement;

sending from said client system said command and chat message to said server;

receiving at said client system a first script interpreted from the command within the chat message for controlling a behavior of said object under control in response to said command from said server and receiving at said client system a second script for controlling the growth of said object based on a growth table, remaining life time and a birth date associated with said object; and controlling at said client system, based on said first script, the displaying of said object under control, wherein said object under control is an object representing a virtual object behaving by an autonomous movement based on a parameter representing a status of the object, wherein said command within the chat message is inputted and said control instruction is received each time a movement of the object is requested.

40. The information processing method according to claim 39, including sending from said server the first script based on a growth parameter associated with said object.

41. The information processing method according to claim 40, wherein the growth parameter is not associated with the command from the client system.

42. The information processing method according to claim 39, wherein the first script for controlling a behavior is an ignore command script.

43. An information processing method for providing a virtual reality space to a client terminal connected through a network comprising steps of:

receiving from said client terminal a command within a chat message associated with a predetermined movement to be performed by an object under control in said virtual reality space from said client terminal;

interpreting said command within the chat message received by said receiving step by referencing a table listing a relationship between said command and said predetermined movement to be performed by said object under control;

transmitting to said client terminal a growth instruction for controlling the growth of said object based on a growth table, remaining life time and a birth date associated with said object; and transmitting to said client terminal a control instruction for controlling the displaying of said object under control based on a result of the interpretation by the interpreting step, wherein said object under control is an object representing a virtual object behaving by an autonomous movement based on a parameter representing a status of the object, wherein said command within the chat message is inputted and said control instruction is received each time a movement of the object is requested.

44. The information processing method according to claim 43, wherein said command within the chat message is a combination of a word and a symbol.

45. The information processing method according to claim 43, wherein said object under control is an object representing a virtual reality life object.

46. The information processing method according to claim 43, wherein said object under control is an object to which a controlling user is set.

47. The information processing method according to claim 43, wherein said virtual reality space is a shared virtual reality space that is simultaneously accessed by a plurality of information processing apparatuses connected to said network.

48. The information processing method according to claim 47, wherein said command is inputted through an input interface of one of said plurality of information processing apparatuses for transmitting a message to any other of said plurality of information processing apparatuses.

49. The information processing method according to claim 48, wherein said command comprises an identifier for making distinction from said message and information about a movement to be performed by said object under control.

50. The information processing method according to claim 43, wherein the command is extracted from a natural language conversation of a user in the chat message.

51. The information processing method according to claim 43, wherein interpreting said command includes referencing a growth parameter associated with said object.

52. The information processing method according to claim 51, wherein the growth parameter is not associated with the command from the client terminal.

53. The information processing method according to claim 43, wherein the control instruction is an ignore command instruction.

54. An information processing apparatus for providing a virtual reality space to a client terminal connected to said information processing apparatus through a network, the apparatus comprising:

a processor;

a memory device which stores a plurality of instructions, which when executed by the processor, performs the steps of:

receiving from said client terminal a command within a chat message associated with a predetermined movement to be performed by an object under control in said virtual reality space from said client terminal;

storing a table listing a relationship between said command and said predetermined movement to be performed by said object under control;

interpreting said command within the chat message received by said receiving means by referencing said table;

transmitting to said client terminal a growth instruction for controlling the growth of said object based on a growth table, remaining life time and a birth date associated with said object; and transmitting to said client terminal a control instruction for controlling the displaying of said object under control based on a result of the interpretation by the interpreting means, wherein said object under control is an object representing a virtual object behaving by an autonomous movement based on a parameter representing a status of the object, wherein said command within the chat message is inputted and said control instruction is received each time a movement of the object is requested.

55. The information processing apparatus according to claim 54, wherein interpreting said command includes referencing a growth parameter associated with said object.

56. The information processing apparatus according to claim 55, wherein the growth parameter is not associated with the command from the client terminal.

57. The information processing apparatus according to claim 54, wherein the control instruction is an ignore command instruction.

* * * * *